(12) United States Patent
Shibata

(10) Patent No.: US 9,218,645 B2
(45) Date of Patent: Dec. 22, 2015

(54) IMAGE PROCESSING METHOD, IMAGE PROCESSING DEVICE, IMAGE FORMING DEVICE AND INKJET RECORDING DEVICE

(71) Applicant: FUJIFILM Corporation, Tokyo (JP)

(72) Inventor: Hiroyuki Shibata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/521,128

(22) Filed: Oct. 22, 2014

(65) Prior Publication Data

US 2015/0043836 A1 Feb. 12, 2015

Related U.S. Application Data

(63) Continuation of application No. PCT/JP2013/061464, filed on Apr. 18, 2013.

(30) Foreign Application Priority Data

Apr. 23, 2012 (JP) .................................. 2012-098186

(51) Int. Cl.
| | | |
|---|---|---|
| *G06T 3/40* | (2006.01) | |
| *B41J 2/21* | (2006.01) | |
| *B41J 2/015* | (2006.01) | |
| *G06K 15/10* | (2006.01) | |
| *G06K 15/02* | (2006.01) | |

(52) U.S. Cl.
CPC ............... *G06T 3/4023* (2013.01); *B41J 2/015* (2013.01); *B41J 2/2139* (2013.01); *B41J 2/2146* (2013.01); *G06K 15/102* (2013.01); *G06K 15/1869* (2013.01); *G06K 2215/101* (2013.01)

(58) Field of Classification Search
USPC ....................................... 382/299; 347/12, 14
See application file for complete search history.

(56) References Cited

U.S. PATENT DOCUMENTS

| | | |
|---|---|---|
| 2006/0061616 A1 | 3/2006 | Yamazaki |
| 2006/0214968 A1 | 9/2006 | Chiwata |
| 2006/0214971 A1 | 9/2006 | Yamazaki |
| 2011/0074862 A1 | 3/2011 | Sasayama |

FOREIGN PATENT DOCUMENTS

| | | |
|---|---|---|
| JP | 2004-202795 A | 7/2004 |
| JP | 2006-76085 A | 3/2006 |

(Continued)

OTHER PUBLICATIONS

International Search Report, issued in PCT/JP2013/061464, dated Jul. 23, 2013.

(Continued)

*Primary Examiner* — Duy M Dang
(74) *Attorney, Agent, or Firm* — Birch, Stewart, Kolasch & Birch, LLP

(57) ABSTRACT

An image processing method includes: storing a threshold matrix for quantization processing of input image data, applying mask processing to an abnormal recording element based on abnormal recording element information, correcting a correspondence relationship between a recording element and a threshold such that processing of a pixel to be formed by the abnormal recording element subjected to mask processing is excluded and the continuity of a pattern of the threshold matrix is maintained, and performing quantization processing using a corrected threshold matrix.

12 Claims, 18 Drawing Sheets

(56) References Cited

FOREIGN PATENT DOCUMENTS

| | | |
|---|---|---|
| JP | 2006-82496 A | 3/2006 |
| JP | 2011-73286 A | 3/2006 |
| JP | 2006-212793 A | 8/2006 |
| JP | 4614076 B2 | 1/2011 |
| JP | 4670696 B2 | 4/2011 |

OTHER PUBLICATIONS

Written Opinion of the International Searching Authority, issued in PCT/JP2013/061464, dated Jul. 23, 2013.

International Preliminary Report on Patentability (IPRP) for International Application No. PCT/JP2013/061464, dated Nov. 6, 2014, along with an English translation therof (Forms: PCT/IB/338, PCT/IB/373, PCT/ISA/237, PCT/IB/326).

FIG.2

| NOZZLE NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| THRESHOLD COLUMN | 1 | 2 | 3 | 4 | 5 | 6 | 7 | 8 | 9 | 10 | 11 | 12 | 13 |
| THRESHOLD MATRIX (STANDARD) | 167 | 179 | 35 | 195 | 19 | 127 | 63 | 183 | 116 | 93 | 249 | 9 | 110 |
| | 11 | 142 | 69 | 117 | 254 | 220 | 132 | 44 | 170 | 224 | 46 | 129 | 191 |
| | 47 | 228 | 204 | 75 | 164 | 27 | 80 | 201 | 6 | 73 | 144 | 222 | 22 |
| | 89 | 128 | 106 | 1 | 185 | 98 | 245 | 148 | 107 | 213 | 67 | 54 | 158 |
| | 8 | 242 | 48 | 231 | 153 | 58 | 13 | 197 | 36 | 160 | 178 | 193 | 103 |
| | 64 | 157 | 173 | 21 | 123 | 208 | 137 | 94 | 252 | 84 | 33 | 168 | 12 |
| | 118 | 207 | 87 | 180 | 66 | 239 | 42 | 113 | 226 | 52 | 126 | 243 | 78 |
| | 233 | 28 | 101 | 250 | 39 | 133 | 190 | 16 | 156 | 134 | 218 | 29 | 118 |
| | 122 | 193 | 139 | 62 | 215 | 163 | 81 | 96 | 202 | 4 | 92 | 172 | 56 |
| | 14 | 73 | 188 | 3 | 111 | 31 | 255 | 177 | 59 | 247 | 151 | 206 | 235 |
| | 223 | 236 | 91 | 171 | 225 | 70 | 145 | 10 | 141 | 109 | 71 | 25 | 121 |
| | 34 | 165 | 115 | 45 | 217 | 125 | 194 | 54 | 228 | 37 | 185 | 240 | 87 |
| | 213 | 49 | 200 | 23 | 147 | 77 | 24 | 211 | 119 | 167 | 75 | 161 | 213 |

| NOZZLE NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| THRESHOLD COLUMN | 1 | 2 | 3 | 4 | 5 | 6 | 7 | 8 | 9 | 10 | 11 | 12 | 13 |
| THRESHOLD MATRIX (AFTER CORRESPONDENCE RELATIONSHIP CORRECTION) | 167 | 179 | 35 | 195 | 19 | 127 | 255 | 63 | 183 | 116 | | 93 | 249 |
| | 11 | 142 | 69 | 117 | 254 | 220 | 255 | 132 | 44 | 170 | 255 | 224 | 46 |
| | 47 | 228 | 204 | 75 | 164 | 27 | 255 | 80 | 201 | 6 | 255 | 73 | 144 |
| | 89 | 128 | 106 | 1 | 185 | 98 | 255 | 245 | 148 | 107 | 255 | 213 | 67 |
| | 8 | 242 | 48 | 231 | 153 | 58 | 255 | 13 | 197 | 36 | 255 | 160 | 178 |
| | 64 | 157 | 173 | 21 | 123 | 208 | 255 | 137 | 94 | 252 | 255 | 84 | 33 |
| | 118 | 207 | 87 | 180 | 66 | 239 | 255 | 42 | 113 | 226 | 255 | 52 | 126 |
| | 233 | 28 | 101 | 250 | 39 | 133 | 255 | 190 | 16 | 156 | 255 | 134 | 218 |
| | 122 | 193 | 139 | 62 | 215 | 163 | 255 | 81 | 96 | 202 | 255 | 4 | 92 |
| | 14 | 73 | 188 | 3 | 111 | 31 | 255 | 255 | 177 | 59 | 255 | 247 | 151 |
| | 223 | 236 | 91 | 171 | 225 | 70 | 255 | 145 | 10 | 141 | 255 | 109 | 71 |
| | 34 | 165 | 115 | 45 | 217 | 125 | 255 | 194 | 54 | 228 | 255 | 37 | 185 |
| | 213 | 49 | 200 | 23 | 147 | 77 | 255 | 24 | 211 | 119 | 255 | 167 | 75 |

FIG.4

| NOZZLE NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| THRESHOLD COLUMN | 1 | 2 | 3 | 4 | 5 | 6 | 7 | 8 | 9 | 10 | 11 | 12 | 13 |
| THRESHOLD MATRIX (AFTER THRESHOLD CHANGE) | 167 | 179 | 35 | 195 | 19 | 85 | 255 | 42 | 183 | 77 | | 93 | 11 |
| | 11 | 142 | 69 | 117 | 254 | 147 | 255 | 88 | 44 | 113 | 255 | 224 | 249 |
| | 47 | 228 | 204 | 75 | 164 | 18 | 255 | 53 | 201 | 4 | 255 | 73 | 46 |
| | 89 | 128 | 106 | 1 | 185 | 65 | 255 | 163 | 148 | 71 | 255 | 213 | 144 |
| | 8 | 242 | 48 | 231 | 153 | 36 | 255 | 9 | 197 | 24 | 255 | 160 | 67 |
| | 64 | 157 | 173 | 21 | 123 | 139 | 255 | 91 | 94 | 168 | 255 | 84 | 178 |
| | 118 | 207 | 87 | 180 | 66 | 159 | 255 | 28 | 113 | 151 | 255 | 52 | 33 |
| | 233 | 28 | 101 | 250 | 39 | 89 | 255 | 127 | 16 | 104 | 255 | 134 | 126 |
| | 122 | 193 | 139 | 62 | 215 | 109 | 255 | 54 | 96 | 135 | 255 | 4 | 218 |
| | 14 | 73 | 188 | 3 | 111 | 21 | 255 | 170 | 177 | 39 | 255 | 247 | 92 |
| | 223 | 236 | 91 | 171 | 225 | 47 | 255 | 97 | 10 | 94 | 255 | 109 | 151 |
| | 34 | 165 | 115 | 45 | 217 | 83 | 255 | 129 | 54 | 129 | 255 | 37 | 71 |
| | 213 | 49 | 200 | 23 | 147 | 51 | 255 | 16 | 211 | 16 | 255 | 167 | 185 |
| | | | | | | | | | | | | | 75 |

FIG.10

| NOZZLE NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| THRESHOLD COLUMN | 1 | 2 | 3 | 4 | 5 | 6 |  | 7 | 8 | 9 |  | 10 | 11 |
| THRESHOLD MATRIX | | | | | | | | | | | | | |

IMAGE PROCESSING METHOD, IMAGE PROCESSING DEVICE, IMAGE FORMING DEVICE AND INKJET RECORDING DEVICE

CROSS-REFERENCE TO RELATED APPLICATIONS

This application is a Continuation of PCT International Application No. PCT/JP2013/061464 filed on Apr. 18, 2013, which claims priority under 35 U.S.C §119(a) to Japanese Patent Application No. 2012-098186 filed on Apr. 23, 2012. Each of the above applications is hereby expressly incorporated by reference, in their entirety, into the present application.

BACKGROUND OF THE INVENTION

1. Field of the Invention

The present invention relates to an image processing method, an image processing device, an image forming device, and an inkjet recording device, and particularly relates to a quantization processing technology that converts multi-gradation image data into image data of a gradation number less than an original gradation number.

2. Description of the Related Art

An inkjet recording device that forms a color image on a recording medium has a configuration including an inkjet head of a full line type in which nozzles are installed over a length corresponding to an entire width of the recording medium.

In a single pass scheme, a full-line type inkjet head and a recording medium are relatively moved only once, and an image is formed over a whole surface of the recording medium. According to this single pass scheme, it is possible to perform image formation at higher speed than a serial scheme in which the head is carried in a main scanning direction to perform image formation in the same direction while the recording medium is intermittently sent at predetermined feed pitches in a sub-scanning direction.

In inkjet image formation of the single pass scheme, when an abnormal nozzle occurs like abnormality of an ejection (flying) direction, abnormality of an ejection droplet amount and non-ejection, and so on, a streak (streak-like density unevenness) so occurs. There is known a technique that masks the abnormal nozzle, applies density correction to a normal nozzle near the abnormal nozzle and lowers the visibility of the streak in order to suppress the occurrence of the streak resulting from the occurrence of the abnormal nozzle.

Japanese Patent No. 4604614 (PTL 1) discloses a technology that lowers the streak visibility by converting a defective nozzle pixel into a minimum density and assigning a density exchange table of higher density than peripheral nozzles of a defective nozzle.

Japanese Patent Application Laid-Open No. 2004-202795 (PTL 2) discloses a technology that selects a dither matrix based on the position of a defective nozzle and performs quantization processing.

Japanese Patent No. 4670696 (PTL 3) discloses an image processing method that prevents an occurrence of an artifact in an output image by acquiring non-ejection position information in quantization processing to generate pseudo-gradation data from input image data and replacing a basic threshold matrix with a sub-matrix for non-ejection (a threshold matrix that realizes dot arrangement in which a streak due to non-ejection is not remarkable) with respect to a peripheral region including the non-ejection position.

Japanese Patent No. 4614076 (PTL 4) discloses a technology that corrects a threshold matrix based on an error in nozzle ejection characteristics, reduces image density unevenness and reduces graininess in digital half-toning using the threshold matrix.

SUMMARY OF THE INVENTION

However, when the technology disclosed in PTL 1 is used for quantization processing by a threshold matrix, since a dot pattern to be formed on a threshold matrix may not be formed in an image position corresponding to a defective nozzle, a halftone pattern collapses. As a result, graininess deteriorates, and it is visually checked as an artifact.

When the technology disclosed in PTL 2 is applied to the problem of above-mentioned PTL 1, there is a possibility that it is possible to suppress granular deterioration. However, since a dedicated threshold matrix is prepared around a non-ejection position, a memory to store this dedicated threshold matrix is required. Moreover, when non-ejection of various periods is tried to be supported, it is necessary to prepare more threshold matrices.

Therefore, as disclosed in PTL 3, when it is replaced with a smaller sub-matrix in order to suppress an increase in a memory capacity, it becomes difficult to sufficiently secure pattern continuity in a junction between a region that is replaced with the sub-matrix and a region that is not replaced with the sub-matrix. Therefore, a granule deteriorates in a streak manner in the junction between both of the regions, and the streak may not be able to be appropriately corrected.

In the technology disclosed in PTL 4, since the thresholds of threshold matrices in the same column are replaced so as to improve a granule, granular deterioration may be suppressed. However, in a case where a large number of non-ejection nozzles occur, since the processing time of a process to replace the thresholds greatly increases, it is not possible to implement prompt processing. Therefore, it is not possible to perform high-speed printing that is an advantage of the single pass scheme.

The present invention is made in view of such conditions, and it is an object to provide an image processing method, image processing device, image forming device and inkjet recording device that correct a streak without causing an artifact in a record image while suppressing a cost increase in a simple manner.

To achieve the above-mentioned object, an image processing method according to one mode of the present invention includes: a threshold matrix storage step of storing a threshold matrix used for quantization processing that converts input image data into image data having a gradation number less than a gradation number which the image data has; an abnormal recording element information acquisition step of acquiring abnormal recording element information; a mask processing step of applying mask processing to an abnormal recording element based on the acquired abnormal recording element information; a threshold matrix correction step of correcting a correspondence relationship between a recording element and a threshold, such that processing of a pixel to be formed by the abnormal recording element subjected to the mask processing is excluded and continuity of a pattern of the threshold matrix is maintained; and a quantization processing step of performing quantization processing using the corrected threshold matrix.

According to the present invention, an abnormal recording element is masked based on abnormal recording element information, and processing of a pixel formed by the abnormal recording element can be eliminated. In addition, the relationship between a recording element and a threshold is corrected such that the continuity of a threshold matrix pattern is maintained, and quantization processing is performed using the threshold matrix after correction. By this means, the occurrence of discontinuity of the threshold matrix pattern due to the mask of the abnormal recording element is suppressed. In addition, since the occurrence of an artifact resulting from the lack of a partial threshold of the threshold matrix is suppressed, the graininess of an output image is not deteriorated.

BRIEF DESCRIPTION OF THE DRAWINGS

FIG. 2 is an explanatory diagram illustrating a standard dither matrix;

FIG. 3 is an explanatory diagram illustrating a dither matrix after correspondence relationship correction;

FIG. 4 is an explanatory diagram illustrating a dither matrix after a threshold of an adjacent nozzle is changed;

FIG. 10 is an explanatory diagram of a quantization processing direction;

DETAILED DESCRIPTION OF EXEMPLARY EMBODIMENTS

In the following, modes to implement the present invention are described in detail according to the accompanying drawings.

First Embodiment

Outline of Image Processing Method

Figure 1:
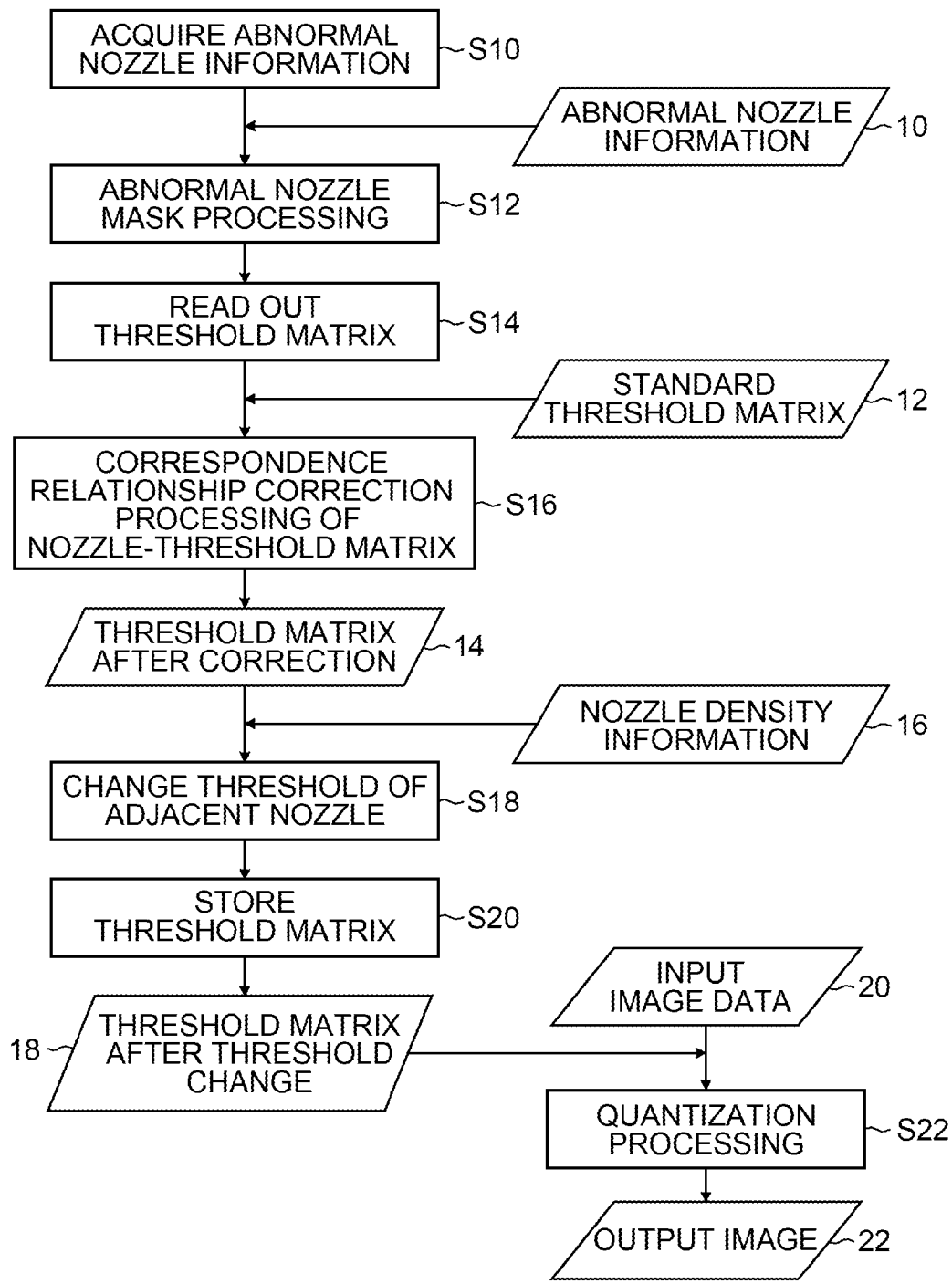
FIG. 1 is a flowchart illustrating a flow of an image processing method according to the first embodiment of the present invention.

FIG. 1 is a flowchart illustrating a flow of an image forming method according to the present invention. In the following explanation, image formation of a single pass scheme using a full-line type inkjet head is presumed (see FIG. 16).

"Full-line type inkjet head" is an inkjet head having a structure in which multiple nozzles (recording elements) are disposed over length corresponding to a total length of a recording medium in a direction orthogonal to a conveyance direction of the recording medium (total length of an image forming region in the direction).

Moreover, "single pass scheme" is a scheme to relatively move an inkjet head and a recording medium only once and form an image over a whole surface of the recording medium (whole area of an image forming region).

In the image processing method illustrated in the figure, quantization processing is performed so as to skip a pixel to be formed by an abnormal nozzle. In the present embodiment, a method of using a threshold matrix (dither matrix) is described.

Here, "pixel" is a constituent unit of an input image and output image, and one pixel of the output image is formed with one dot or multiple dots.

The image processing method shown in the present embodiment includes an abnormal nozzle information acquisition process (step S10) in which abnormal nozzle information 10 is acquired, and an abnormal nozzle mask processing (mask processing) process (step S12) in which mask processing is applied to a pixel (pixel corresponding to an abnormal nozzle) to be formed by the abnormal nozzle based on the abnormal nozzle information 10 acquired in the abnormal nozzle information acquisition process.

It further includes a threshold matrix readout process (step S14) in which a standard threshold matrix 12 that is stored beforehand (threshold matrix storage process) is read out, and a nozzle-threshold matrix correspondence relationship correction processing (threshold matrix correction) process (step S16) in which a threshold matrix is rearranged so as to exclude processing of the pixel masked as a pixel corresponding to the abnormal nozzle, with respect to the read standard threshold matrix 12, and the correspondence relationship between a nozzle and a threshold matrix is corrected.

It further includes an adjacent nozzle threshold change process (change process) (step S18) in which a threshold of a pixel formed by a nozzle adjacent to an abnormal nozzle is changed with reference to density information 16 of the nozzle adjacent to the abnormal nozzle in a threshold matrix (threshold matrix after correspondence relationship correction) 14 after the correspondence relationship between the nozzle and the threshold matrix is corrected, a threshold matrix storage process (step S20) in which a threshold matrix 18 after threshold change is stored, and a quantization processing process (step S22) in which quantization processing is applied to input image data 20 by the use of the changed threshold matrix 18 and an output image (halftone image) 22 is generated.

In the abnormal nozzle information acquisition process (step S10) illustrated in FIG. 1, information on an abnormal nozzle stored in a predetermined memory is acquired. "Abnormal nozzle" includes a non-ejection nozzle which cannot eject ink, and a nozzle which can eject ink and in which an abnormality of an ink flying direction (ink impact position) or an abnormality of an ink ejection amount is caused.

The abnormal nozzle information includes the abnormal nozzle number and the abnormal nozzle state (non-ejection or ejection abnormality). Information which is detected at the time of inspection of the inkjet head and stored in a predetermined memory may be acquired as the abnormal nozzle information, or the detection of ejection abnormality of the inkjet head may be implemented and the detection result may be acquired as the abnormal nozzle information.

In the abnormal nozzle mask processing process (step S12), a mask for quantization processing is applied to a group of pixels to be formed by the abnormal nozzle based on the abnormal nozzle information. That is, the flow of the quantization processing is decided such that the group of pixels is excluded from a normal flow of the quantization processing.

For example, a threshold corresponding to a group of pixels to be formed by an abnormal nozzle may be changed to a maximum value of the pixel values of an input image (in a case where the maximum value is non-recorded), or the pixel value of the group of pixels in input image data may be changed to a minimum value (in a case where the minimum value is non-recorded). That is, the group of pixels to be formed by the abnormal nozzle is changed into the non-recorded threshold or pixel value.

Here, in a full-line type inkjet head, since each nozzle corresponds to pixels of one column in a direction parallel to the conveyance direction of a recording medium, the group of pixels to be formed by the abnormal nozzle becomes a pixel column of one column along the same direction.

<Explanation of Correction of Correspondence Relationship Between Nozzle-Threshold Matrix, and Threshold Change>

FIG. 2 is an explanatory diagram illustrating a standard threshold matrix. In the threshold matrix readout process (step S14) illustrated in FIG. 1, the standard threshold matrix 12 stored beforehand in a predetermined memory is read out.

As illustrated in FIG. 2, in the standard threshold matrix 12, a predetermined threshold is assigned to each cell forming a matrix. In this example, nozzles of nozzle numbers 7 and 11 are abnormal nozzles. In the standard threshold matrix 12 illustrated in FIG. 2, a slash is assigned to cells (thresholds) corresponding to pixels formed (drawn) by the abnormal nozzles.

FIG. 3 is an explanatory diagram illustrating a threshold matrix (threshold matrix after correspondence relationship correction) 14 in which the relation between the nozzle and the threshold is corrected. The threshold matrix 14 after correspondence relationship correction illustrated in FIG. 3 is generated in the nozzle-threshold matrix correspondence relationship correction processing process (step S16) illustrated in FIG. 1.

In the threshold matrix 14 after correspondence relationship correction illustrated in the figure, "255 (HEX)" (which is the maximum value of the pixel value and a non-recorded pixel value) is assigned to cells corresponding to the abnormal nozzles (nozzles of nozzle numbers 7 and 11) as a threshold.

Moreover, in the standard threshold matrix 12 (see FIG. 2), thresholds assigned to the cells corresponding to the nozzle of nozzle number 7 are shifted by one column to cells corresponding to the nozzle of nozzle number 8, and thresholds assigned to cells corresponding to nozzle numbers 8 and 9 are also shifted by one column respectively.

In addition, in a case where input image data is expressed by pixel values from 0 (HEX) to 255 (HEX), "255 (HEX)" is assigned to the cells corresponding to nozzle number 11 as a threshold. In the standard threshold matrix 12, thresholds assigned to cells corresponding to nozzles after nozzle number 10 are shifted only by the column number of the abnormal nozzle number (two rows in this example).

That is, a threshold compared with the pixel value of a pixel to be formed by an abnormal nozzle is assumed to be a non-recorded pixel value (maximum value or minimum value) such that the pixel to be formed by the masked abnormal nozzle is not drawn. Therefore, the pixel to be formed by the abnormal nozzle is substantially excluded from processing in which the ON/OFF of a pixel (dot) is decided by comparison with a threshold.

Moreover, when a non-recorded pixel value is assigned as a threshold corresponding to an abnormal nozzle, thresholds originally assigned to cells corresponding to the abnormal nozzle are shifted by one column and sequentially shifted in threshold column units in the column direction (nozzle arrangement direction).

It is considered that a cause of generation of an artifact due to the masking of the abnormal nozzle is originated in that, when a dot originally existing in the masked position (pixel) disappears, a pattern of the threshold matrix collapses or the continuity of quantization processing is lost around the mask.

In the image processing method shown in this example, a threshold matrix is rearranged so as to exclude an abnormal nozzle, and corrects the correspondence relationship between a nozzle and a threshold. By this means, the disappearance of a dot that originally exists in a pixel masked as an abnormal nozzle and the occurrence of discontinuity of quantization processing are avoided.

FIG. 4 is an explanatory diagram of the threshold matrix 18 after threshold change in which thresholds compared with pixels formed by an adjacent nozzle of an abnormal nozzle are changed. The threshold matrix 18 after threshold change illustrated in the figure is generated in the adjacent nozzle threshold change process in FIG. 1 (step S18: change process).

When a pixel to be formed by the abnormal nozzle is masked, since a dot that is essentially formed to the masked pixel is lacked, this has to be compensated. Therefore, a threshold of the threshold matrix 14 after correspondence relationship correction illustrated in FIG. 3 is changed by the use of the adjacent nozzle of the abnormal nozzle such that deficient ink (dot) is interpolated.

Specifically, in the formation of a deficient dot due to the abnormality of the nozzle of nozzle number 7, the nozzles of nozzle numbers 6 and 8 which are both sides of the nozzle of nozzle number 7 are used.

Moreover, in the formation of a deficient dot due to the abnormality of the nozzle of nozzle number 11, the nozzles of nozzle numbers 10 and 12 which are both sides of the nozzle of nozzle number 11 are used. In the threshold matrix 18 after threshold change illustrated in FIG. 4, thresholds corresponding to the nozzles of nozzle numbers 6, 8, 10 and 12 are assumed to be values dividing original thresholds by 1.5.

That is, the possibility becomes higher that dots are formed by these adjacent nozzles by making thresholds corresponding to the adjacent nozzles of the abnormal nozzle less than the original values, and the dot lack resulting from the occurrence of the abnormal nozzle is compensated for. Here, in a case where the maximum value of the pixel value is non-recorded, it only has to make the thresholds corresponding to the adjacent nozzles of the abnormal nozzle less than the original thresholds.

Here, in the threshold matrix 18 after threshold change illustrated in FIG. 4, a mode is exemplified where the thresholds corresponding to the adjacent nozzles of the abnormal nozzle are changed, a threshold corresponding to a normal nozzle near the abnormal nozzle may be changed.

For example, as a target in which a threshold is changed, a further adjacent nozzle of an adjacent nozzle of an abnormal nozzle may be included. A nozzle near the abnormal nozzle can be arbitrarily decided.

Moreover, although it has been described before, when the threshold of an adjacent nozzle of an abnormal nozzle is changed, taking into account the recording characteristic of the adjacent nozzle of the abnormal nozzle, it is possible to change the threshold so as to correct this characteristic.

Figure 5:
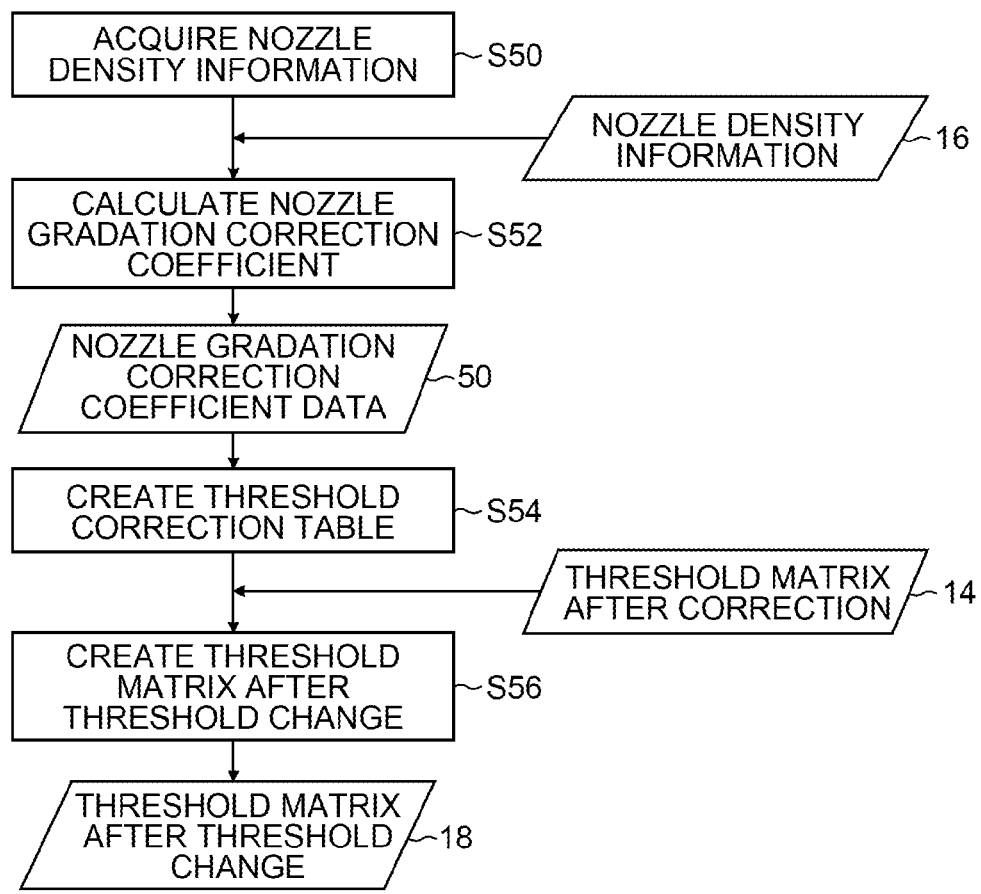
FIG. 5 is a flowchart illustrating one example of threshold change processing of an adjacent nozzle.

FIG. 5 is a flowchart illustrating a configuration example of the adjacent nozzle threshold change process (see FIG. 1). Here, in FIG. 5, the same reference numerals are assigned to parts identical or similar to FIG. 1, and the explanation is omitted.

As illustrated in the figure, in the adjacent nozzle threshold change process, the density information 16 of an adjacent nozzle of an abnormal nozzle is acquired (step S50), and a nozzle gradation correction coefficient ($F_b^{-1}{}_i$ in FIG. 6, where i designates a nozzle number) is calculated (step S52). Next, a threshold correction table (illustrated with reference numeral 54 in FIG. 6) is created based on nozzle gradation correction coefficient data 50 calculated in step S52 (step S54).

Next, a threshold of the threshold matrix 14 after correspondence relationship correction is changed by the threshold correction table (step S56). Thus, the threshold matrix 18 after threshold change is created.

Figure 6:
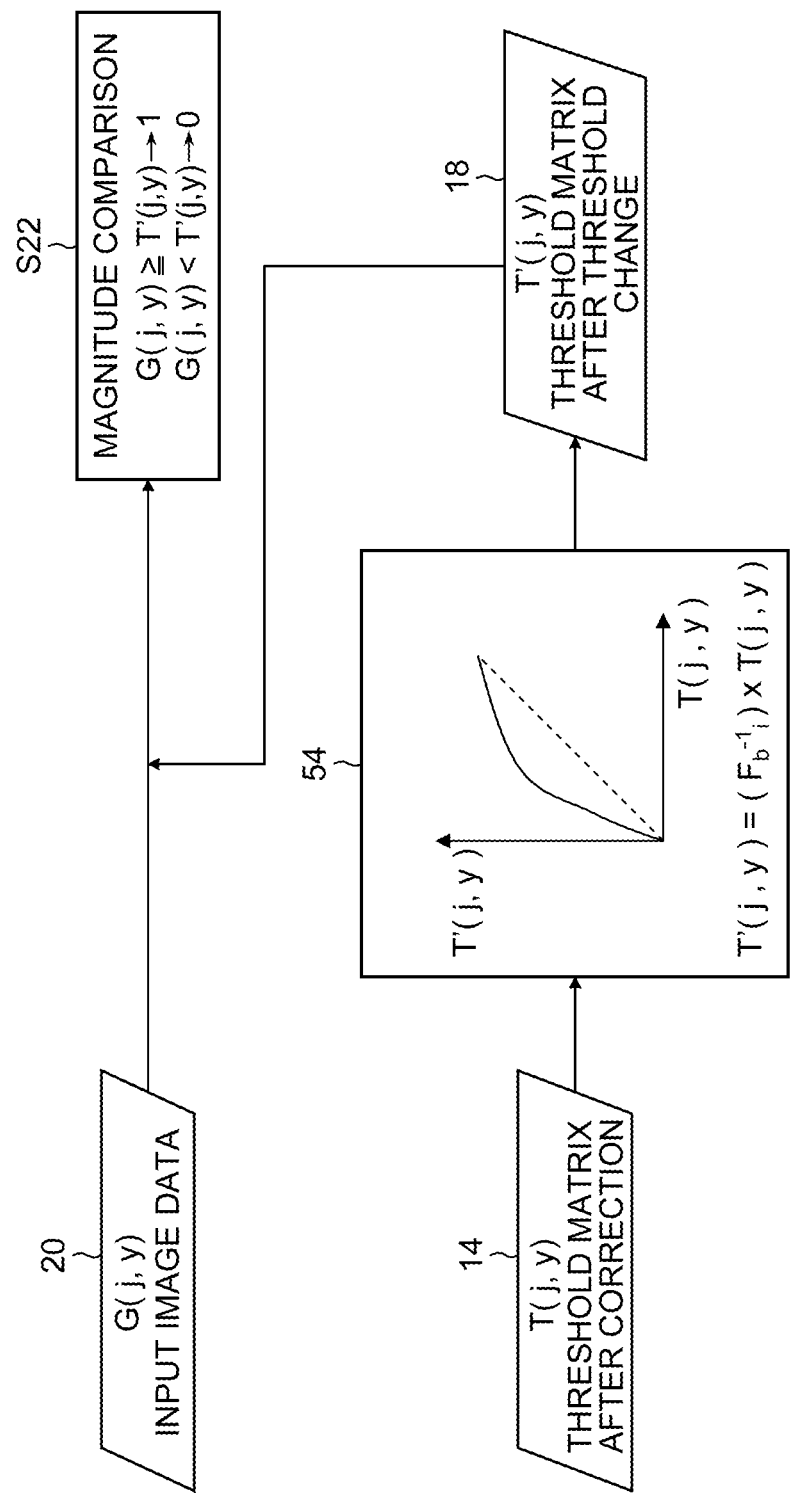
FIG. 6 is a conceptual diagram of threshold change processing of an adjacent nozzle illustrated in FIG. 5.

FIG. 6 is an explanatory diagram of the nozzle gradation correction coefficient and the threshold correction table. When the coordinates of a pixel are expressed as (j,y), threshold matrix T'(j,y) after threshold change is expressed as following Equation (1) by the use of threshold matrix T(j,y) after correspondence relationship correction and nozzle gradation correction coefficient $F_b^{-1}{}_i$.

$$T'(j,y)=(F_b^{-1}{}_i) \times T(j,y) \quad (1)$$

Using the threshold matrix after threshold change generated in this way, comparison in the magnitude relationship between input image G(j,y) and the threshold matrix after threshold change is performed. Further, the ON/OFF of each pixel dot is decided based on the comparison result (step S22). In the case of G(j,y)≥T'(j,y), the pixel dot is 1 (on). On the other hand, in the case of G(j,y)<T'(j,y), the pixel dot is 0 (off).

<Explanation of Image Processing Device>

Figure 7:
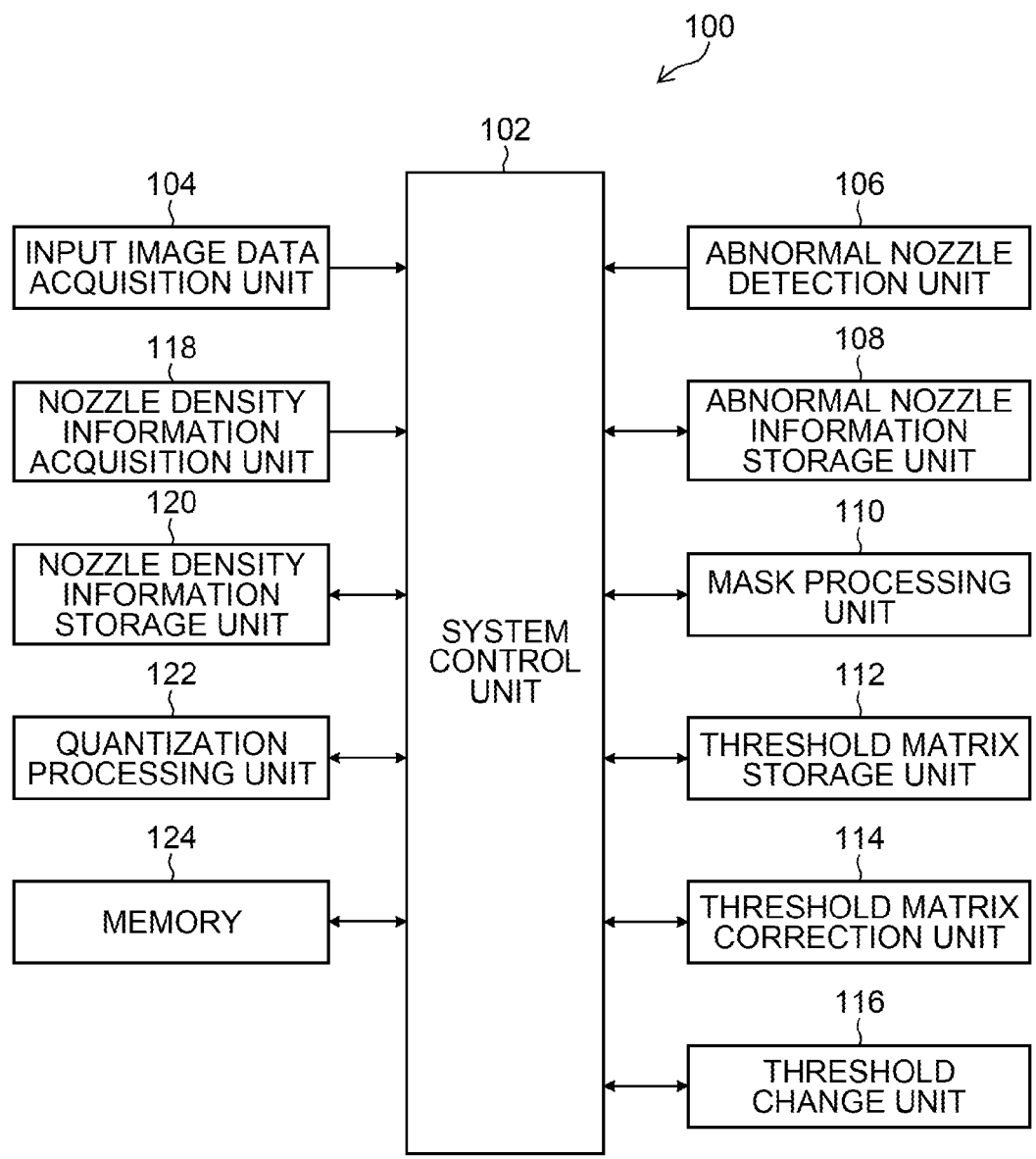
FIG. 7 is a block diagram of an image processing device according to the first embodiment of the present invention.

FIG. 7 is a block diagram illustrating the whole configuration of an image processing device to realize the image processing method described above. An image processing device 100 illustrated in the figure is applicable to an image processing unit that generates an output image (halftone image) from an input image data in an ink jet recording device.

The image processing device 100 illustrated in FIG. 7 includes: a system control unit 102 (component of the abnormal nozzle information acquisition unit) that performs integrated control of the entire device; an input image data acquisition unit 104 that acquires input image data (for example, raster data from 0 (HEX) to 255 (HEX)); an abnormal nozzle detection unit 106 (component of the abnormal nozzle information acquisition unit) that detects an abnormal nozzle of an inkjet head; an abnormal nozzle information storage unit 108 (component of the abnormal nozzle information acquisition unit) that stores abnormal nozzle information; and a mask processing unit 110 (mask processing unit) that applies mask processing to the abnormal nozzle.

Moreover, the image processing device 100 includes: a threshold matrix storage unit 112 (threshold matrix storage unit) that stores a standard threshold matrix; a threshold matrix correction unit 114 (threshold matrix correction unit) that corrects a correspondence relationship between a nozzle and a threshold matrix according to an abnormal nozzle; a threshold change unit 116 that changes a threshold of an adjacent nozzle of the abnormal nozzle; a nozzle density information acquisition unit 118 that acquires nozzle density information; a nozzle density information storage unit 120 that stores the nozzle density information; a quantization processing unit 122 (quantization processing unit) that applies quantization processing to an input image; and a memory 124.

Since each unit illustrated in FIG. 7 corresponds to each process of the image processing method described using FIGS. 1 to 6, the detailed explanation is omitted here. The memory 124 illustrated in FIG. 7 is used as the primary storage area of data or the operation region of each unit.

Here, it may include a parameter storage unit that stores various parameters and conversion tables used for processing (operation) of each unit of the device, and a program storage unit that stores a program (software) used for processing (operation) of each unit of the device.

Variation Example

Figure 8:
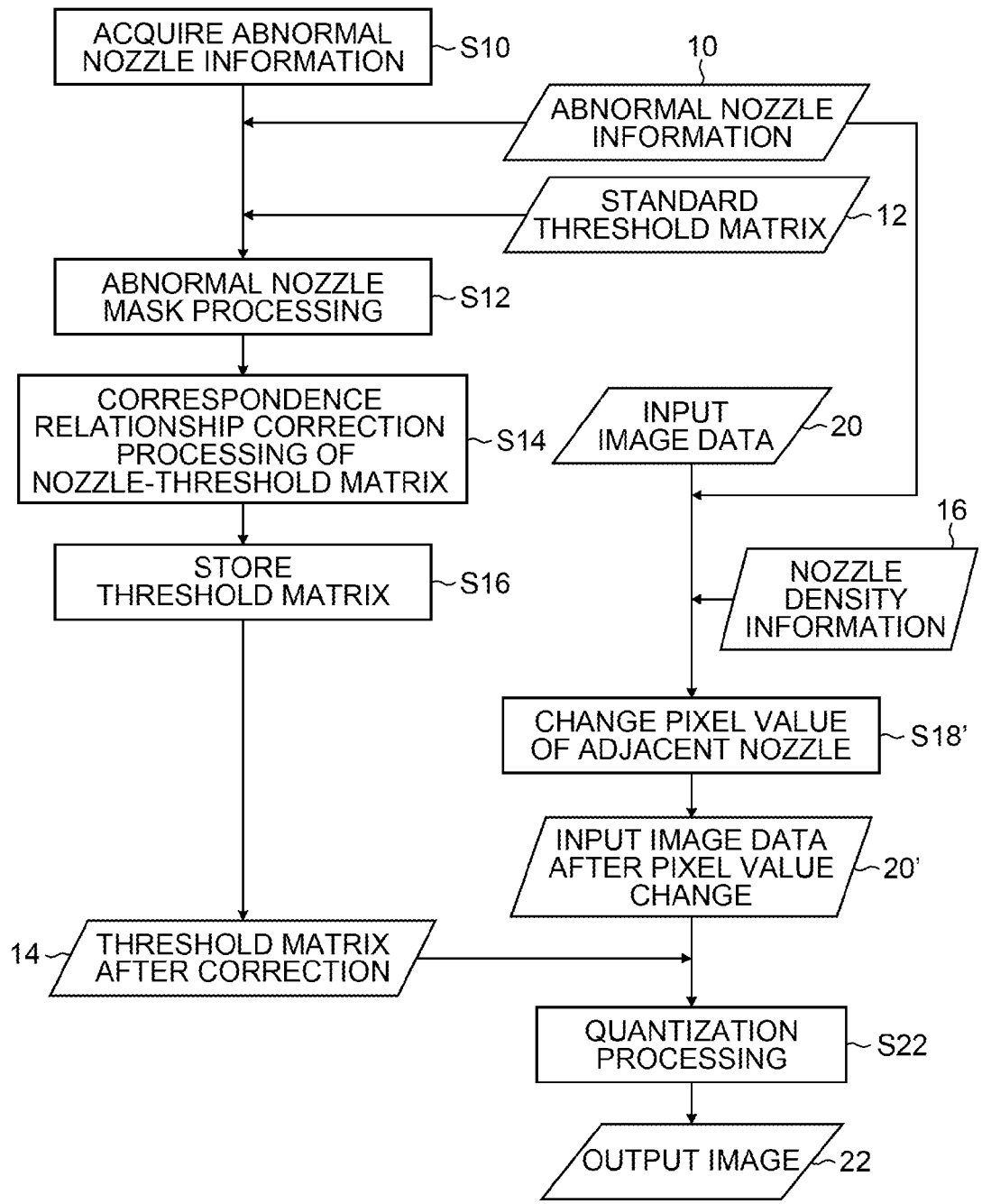
FIG. 8 is a flowchart illustrating a variation example of an image processing method illustrated in FIG. 1.
Figure 9:
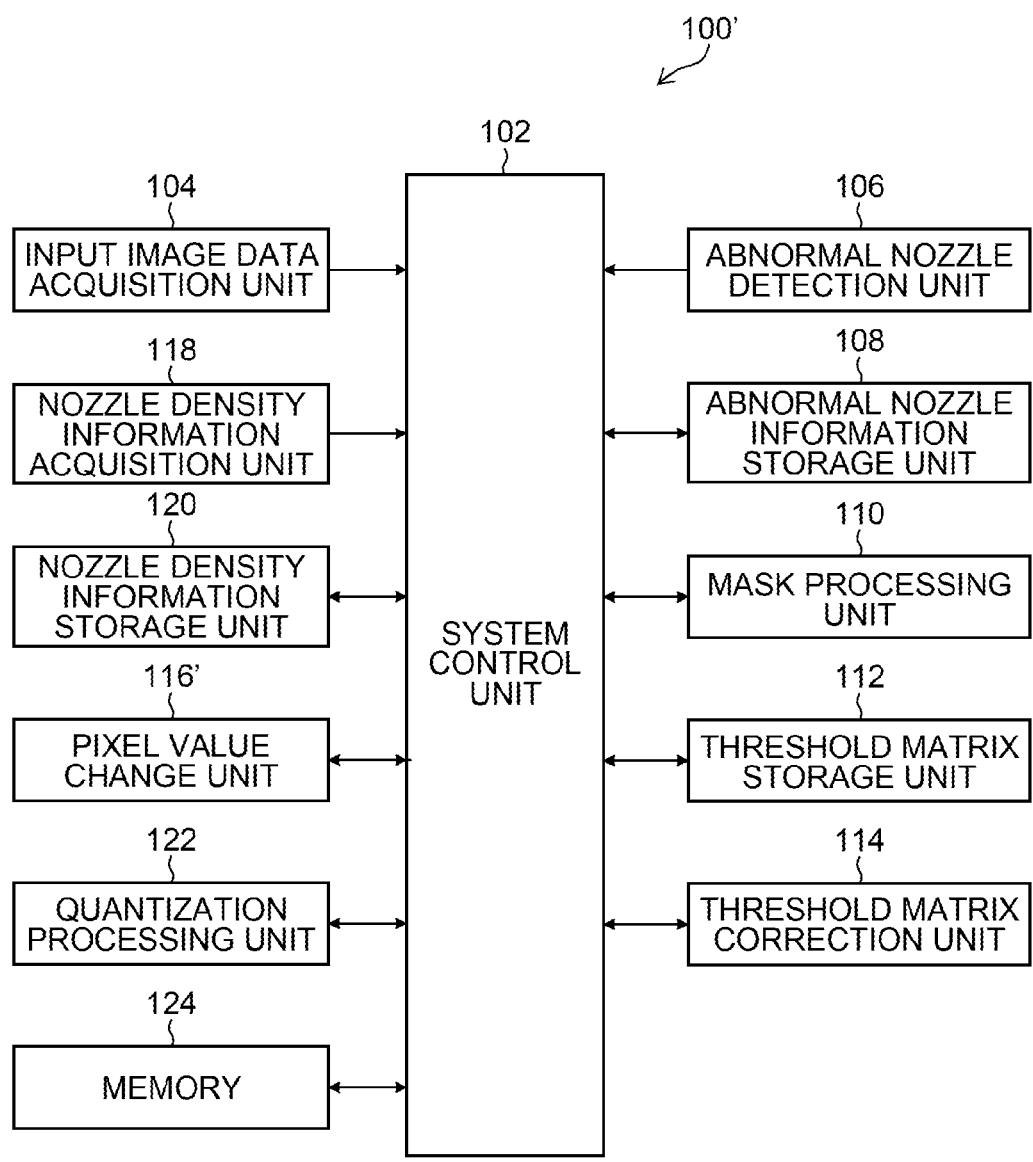
FIG. 9 is a block diagram illustrating a variation example of an image processing device illustrated in FIG. 7.

Next, a variation example of the above-mentioned first embodiment is described. Here, in the following explanation, the same reference numerals are assigned to units identical or similar to the units described above, and the explanation is omitted. FIG. 8 is a flowchart illustrating a variation example of the image processing method illustrated in FIG. 1, and FIG. 9 is a block diagram illustrating a variation example of the image processing device illustrated in FIG. 7.

The image processing method illustrated in FIG. 8 includes a pixel value change (change) process (step S18') that changes the pixel value of a pixel formed by an adjacent nozzle of an abnormal nozzle in input image data, in place of the threshold change process (step S18 in FIG. 1) that changes a threshold corresponding to the adjacent nozzle of the abnormal nozzle.

That is, as a method of compensating for the lack of dot (ink) due to a mask of the abnormal nozzle, the pixel value of the pixel formed by the adjacent nozzle of the abnormal nozzle in the input image is raised from the original value, and quantization processing is applied to input image data 20' after pixel value change by the use of the threshold matrix 14 after correspondence relationship correction in which the correspondence relationship between the nozzle and the threshold matrix is corrected.

Here, when the pixel value of the input image data 20 is changed and the input image data 20' after pixel value change is generated, the density information 16 of each nozzle may be referred to and this may be considered. Moreover, in a mode in which a non-record is assumed to be the maximum value of the pixel value, the pixel value of the pixel formed by the adjacent nozzle of the abnormal nozzle may be lowered from the original value.

The image processing device 100' illustrated in FIG. 9 includes a pixel value change unit 116' that changes (raises) the pixel value of the pixel formed by the adjacent nozzle of the abnormal nozzle in the input image, in place of the threshold change unit 116 in FIG. 7. As a configuration to change (raise) the pixel value of the pixel formed by the adjacent nozzle of the abnormal nozzle in the input image, the number of dots to be formed by the abnormal nozzle may be arbitrarily distributed to an adjacent normal nozzle.

<Explanation of Quantization Processing Direction>

FIG. 10 is an explanatory diagram of the quantization processing direction. In the image processing method mentioned above, in a case where many abnormal nozzles occur, the shift amount of a cell column (threshold column) in a threshold matrix increases.

Meanwhile, by assuming the processing direction of quantization processing to be a direction orthogonal to the nozzle arrangement direction, it is possible to perform the shift processing and the quantization processing in parallel without waiting for a result of cell column shift processing (correction processing of a correspondence relationship between a nozzle and a threshold matrix) in the threshold matrix.

<Effect>

According to the image processing method and device configured as above, an abnormal nozzle is masked using abnormal nozzle information, a pixel to be formed by the masked abnormal nozzle is substantially excluded from the target of comparison processing between the pixel value and a threshold in quantization processing, and comparison processing is performed between the pixel values of other pixels and the threshold. Therefore, the continuity of a threshold pattern in a threshold matrix is not lacked due to masking of the abnormal nozzle.

Then, an artifact that generates an output image due to masking of the abnormal nozzle is suppressed, and graininess of the output image is prevented from being deteriorated.

Second Embodiment

Next, the image processing method according to the second embodiment of the present invention is described. In the second embodiment described below, a mode in which a threshold (dither) matrix scheme and an error diffusion scheme are used together is described.

<Outline of Image Processing Method>

Figure 11A:
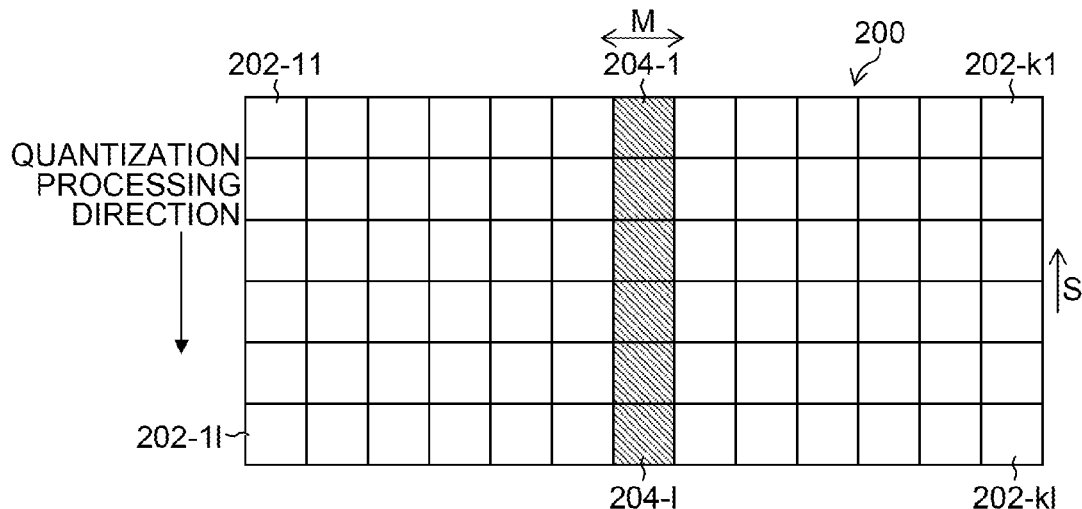
FIG. 11A is an explanatory diagram of an image processing method according to the second embodiment of the present invention.
Figure 11B:
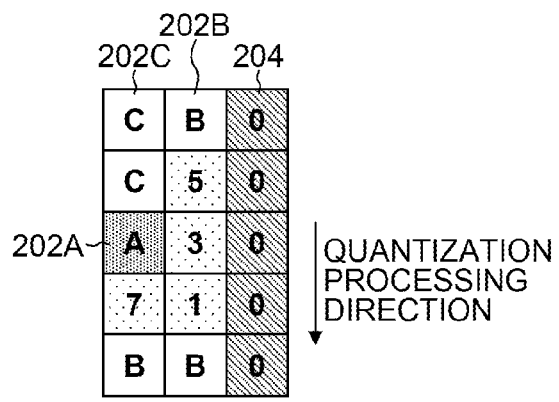
FIG. 11B is an explanatory diagram of the image processing method according to the second embodiment of the present invention.
Figure 11C:
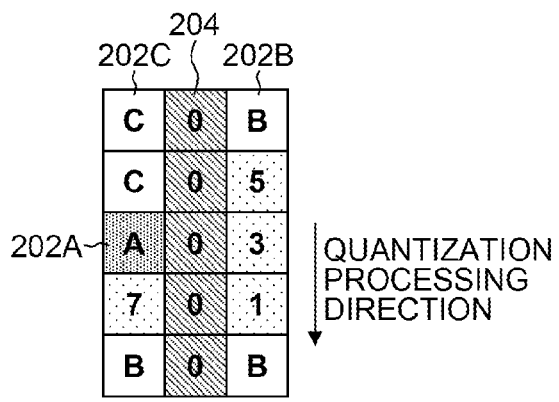
FIG. 11C is an explanatory diagram of the image processing method according to the second embodiment of the present invention.

FIGS. 11A to 11C are explanatory diagrams of an image processing method according to the second embodiment. FIG. 11A is a diagram illustrating the relationship between pixels of an output image and an abnormal nozzle, and FIGS. 11B and 11C are explanatory diagrams of processing in the error diffusion scheme.

In an image 200 illustrated in FIG. 11A, multiple pixels 202-*ll* to 202-*kl* (k and l designate positive integers) are two-dimensionally arranged along main scanning direction M and sub-scanning direction S. "k" designates a number of pixels in the main scanning direction, and "l" designates a number of pixels in the sub-scanning direction.

Pixels 204-*l* to 204-*l* illustrated with a slash in FIG. 11A show pixels to be formed by an abnormal nozzle. That is, in the pixels 204-*l* to 204-*l*, dots are not actually formed or dots of a normal size are not formed in normal positions even if they are formed.

The error diffusion scheme diffuses a difference between the pixel value of each pixel and a threshold (error at the time of quantization processing) to unprocessed circumference pixels. In the image processing method illustrated in this example, an error diffusion matrix is set to a pixel to be formed by the abnormal nozzle such that the inflow of an error by quantization processing of the circumference pixels is suppressed. Here, the direction of the quantization processing is from the upper to lower direction in the figure along sub-scanning direction S.

FIG. 11B is an explanatory diagram of specific processing of error diffusion. In the figure, a pixel 202A with a thick dot hatch, to which reference character A is assigned, is a processing target pixel. A pixel 202B with reference character B is an unprocessed pixel.

Moreover, a pixel 202C with reference character C is a processed pixel, and the ON/OFF of the dot is already decided. A pixel 204 illustrated with a slash hatch is a pixel to be formed by an abnormal nozzle, and the OFF of the dot is decided.

As illustrated in FIG. 11B, in a case where the pixel 204 to be drawn by the abnormal nozzle does not exist in an unprocessed pixel (unprocessed pixel adjacent to a processing target pixel, which is illustrated with a thin dot hatch) around the processing target pixel 202A, normal error diffusion processing is performed.

Here, a value assigned to a pixel in which an error is diffused shows the content of the error (distribution ratio). "7" means that 7/16 of the error is diffused, and "5", "3" and "1" mean that 5/16, 3/16, and 1/16 of the errors are diffused respectively.

As illustrated in FIG. 11C, in a case where the pixel 204 to be formed by an abnormal nozzle exists in an unprocessed pixel around the processing target pixel 202A, an error is not diffused in the pixel 204 to be formed by the abnormal nozzle, and, regarding the quantization processing direction, an error is diffused in an unprocessed pixel 202B (illustrated with a thin dot hatch) adjacent to the pixel 204 to be formed by the abnormal nozzle.

Thus, an error diffusion matrix is configured such that an error due to quantization caused in a peripheral processing target pixel is not diffused to the pixel to be formed by the abnormal nozzle. Therefore, the continuity of error diffusion flow of quantization processing is secured, and the occurrence of an artifact in an output image is suppressed.

Moreover, as a technique of compensating for the lack of a dot to be formed by an abnormal nozzle, a threshold for quantization corresponding to a peripheral nozzle of the abnormal nozzle may be changed or the pixel value of a pixel drawn by the peripheral nozzle of the abnormal nozzle in input image data may be changed.

Meanwhile, it is also possible to change the dot size of an adjacent pixel in the primary scanning direction of the pixel to be formed by the abnormal nozzle and compensate for the lack of a dot to be formed by the abnormal nozzle.

For example, a mode is considered which applies the present embodiment to processing of applying a multi dot that expresses four gradations (gradation numbers 0, 1, 2 and 3) by the use of dots of three kinds of sizes (larger drop, medium drop and smaller drop) and deciding the dot size of each pixel with reference to a lookup table that stores the dot sizes. In such a mode, a lookup table for adjacent pixels of a pixel to be formed by an abnormal nozzle (LUT for adjacent pixels) and a lookup table for other pixels than these (LUT for normal pixels) are prepared. Further, two lookup tables are switched such that the LUT for normal pixels is used for processing of other pixels than the pixel to be formed by the abnormal nozzle and the LUT for adjacent pixels is used for processing of adjacent pixels of the pixel to be formed by the abnormal nozzle.

The LUT for normal pixels is assumed to have a configuration in which the medium drop and the smaller drop are mainly used, and the LUT for adjacent pixels is assumed to have a configuration in which the larger drop and the medium drop are mainly used. In this case, it is possible to increase an occurrence probability of a dot of a larger size than a normally used dot size in the adjacent pixels of the pixel to be formed by the abnormal nozzle.

As an example of a lookup table that stores dot sizes, there is a lookup table (dotlut) that stores "dot[j][level]" in the flowchart described below.

Figure 12:
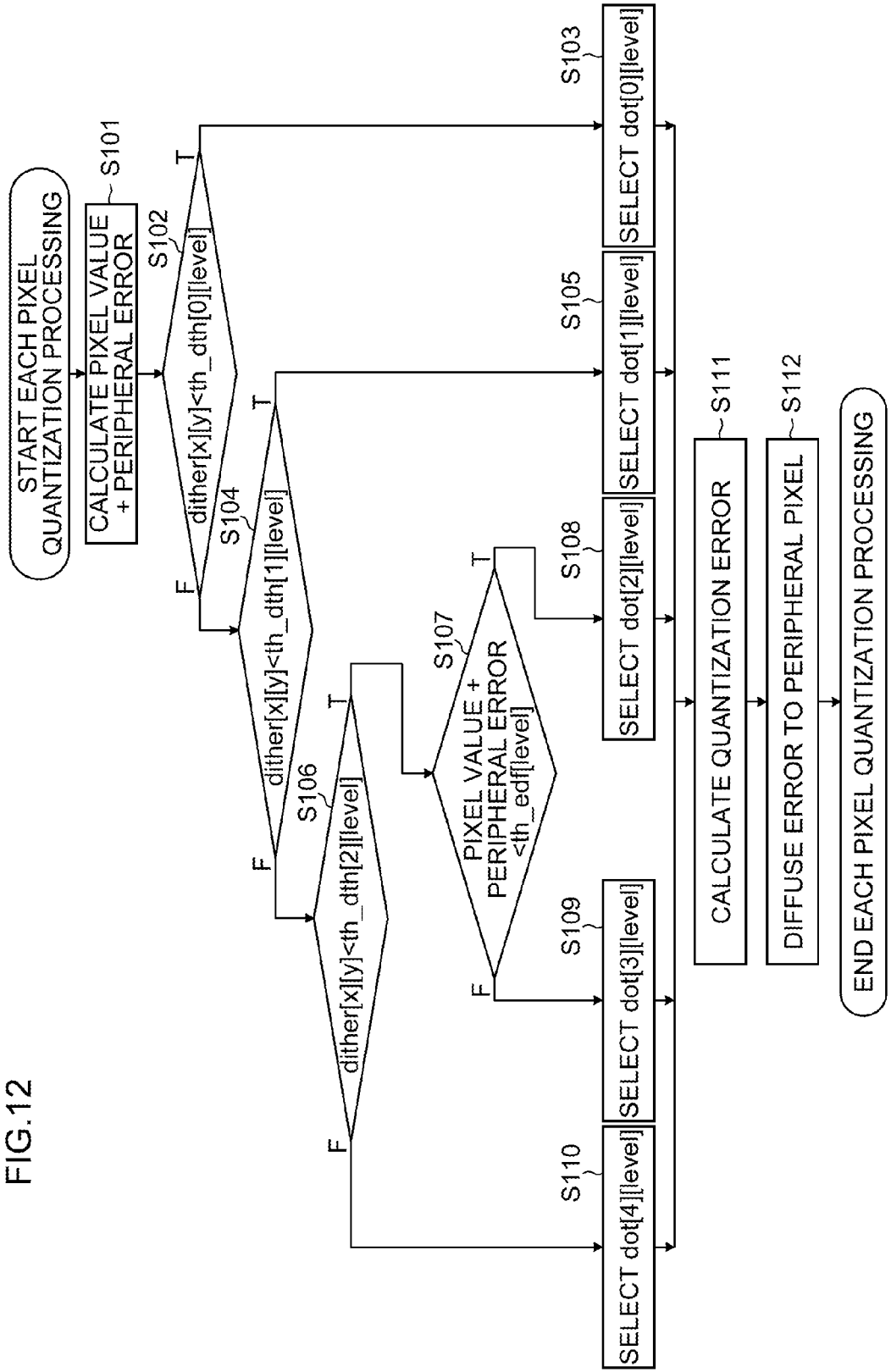
FIG. 12 is a flowchart illustrating a flow of quantization processing of a dither error diffusion combination scheme.

FIG. 12 is a flowchart illustrating the flow of quantization processing to which a dither error diffusion combination scheme is applied. In FIG. 12, dither[x][y] designates an element (dither value) of a two-dimensional dither matrix. th_dth[i][level] designates a threshold compared with the dither matrix (i=0,1,2). th_edf[level] designates an error diffusion threshold.

dot[j][level] is associated with any dot size of "no drop" (j=0), "smaller drop" (j=1), "medium drop" (j=2) and "larger drop" (j=3) every pixel value (level). Here, dot[j][level] with a pixel value as a parameter is stored in a lookup table.

When each pixel quantization processing starts, first, a pixel value including a peripheral error, which is the sum of the original pixel value (original gradation value) of a target pixel and a peripheral error (error caused at the time of quantization processing of a peripheral pixel) diffused to the target pixel by error diffusion, is calculated (step S101).

Next, the region of an image is divided by comparing the dither value (dither[x] [y]) and threshold th_dth[i] [level]. This threshold th_dth[i] [level] is set every pixel value (level) of the target pixel, and is stored in a predetermined memory beforehand.

Here, it is divided into four regions using the first threshold (th_dth[0][level]), the second threshold (th_dth[1][level]) and the third threshold (th_dth[2][level]).

In step S102, the dither value (dither[x][y]) and the first threshold (th_dth[0][level]) are compared. In step S102, in the case of dither[x][y]<th_dth[0][level] (True), the dot size specified by dot[0][level] is selected (step S103).

By contrast, in the case of dither[x] [y]≥th_dth[0] [level] (Failure), it proceeds to step S104, and the dither value (dither [x][y]) and the second threshold (th_dth[1][level]) are compared. In the case of dither[x][y]<th_dth[1][level] (True), the dot size specified by dot[1][level] is selected (step S105), and, in the case of dither[x][y]≥th_dth[1][level] (Failure), it proceeds to step S106.

In step S106, the dither value (dither[x][y]) and the third threshold (th_dth[2][level]) are compared. In the case of dither[x][y]<th_dth[2][level] (True), it proceeds to step S107, and the pixel value including a peripheral error and error diffusion threshold th_edf[level] are compared.

Here, error diffusion threshold th_edf[level] is set every pixel value of the target pixel and stored in a predetermined memory beforehand. In step S107, in the case of (pixel value+ peripheral error)<th_edf[level] (True), the dot size specified by dot[2][level] is selected (step S108).

In the case of (pixel value+peripheral error)≥th_edf[level] (Failure), the dot size specified by dot[3][level] is selected (step S109).

That is, in the region of th_dth[1][level]≤dither[x][y]< th_dth[2][level], quantization processing by an error diffusion method is performed.

In step S106, in the case of dither[x][y]≥th_dth[2][level] (Failure), the dot size specified by dot[4][level] is selected (step S110).

Here, the dot size expressed by dot[j][level] can be arbitrarily decided every pixel value. For example, with respect to a certain pixel value ([level]), it is possible to decide dot[0] [level] as a smaller drop, dot[1][level] as a medium drop, dot[2][level] as no drop and dot[3][level] and dot[4][level] as a larger drop, and so on.

Thus, when quantization processing is applied every region divided according to the pixel value and the dot size of a processing target pixel is selected, a quantization error is calculated (step S111). The quantitation error is a difference with a threshold of quantization processing of the pixel value (which may include an error diffused from a peripheral pixel).

The quantization error calculated in step S111 is diffused to a peripheral unprocessed pixel according to a predetermined error diffusion matrix (step S112). Quantization processing with respect to all pixels is performed by performing steps S101 to S112 on all pixels.

In the quantization processing illustrated in FIG. 12, whether the processing target pixel is an adjacent pixel of a pixel to be formed by an abnormal nozzle is determined based on abnormal nozzle information. Further, in a case where the processing target pixel is the adjacent pixel of the pixel to be formed by the abnormal nozzle, the LUT for normal pixels may be changed to the LUT for adjacent pixels and processing from steps S101 to S112 may be performed.

<Explanation of Image Processing Device>

Figure 13:
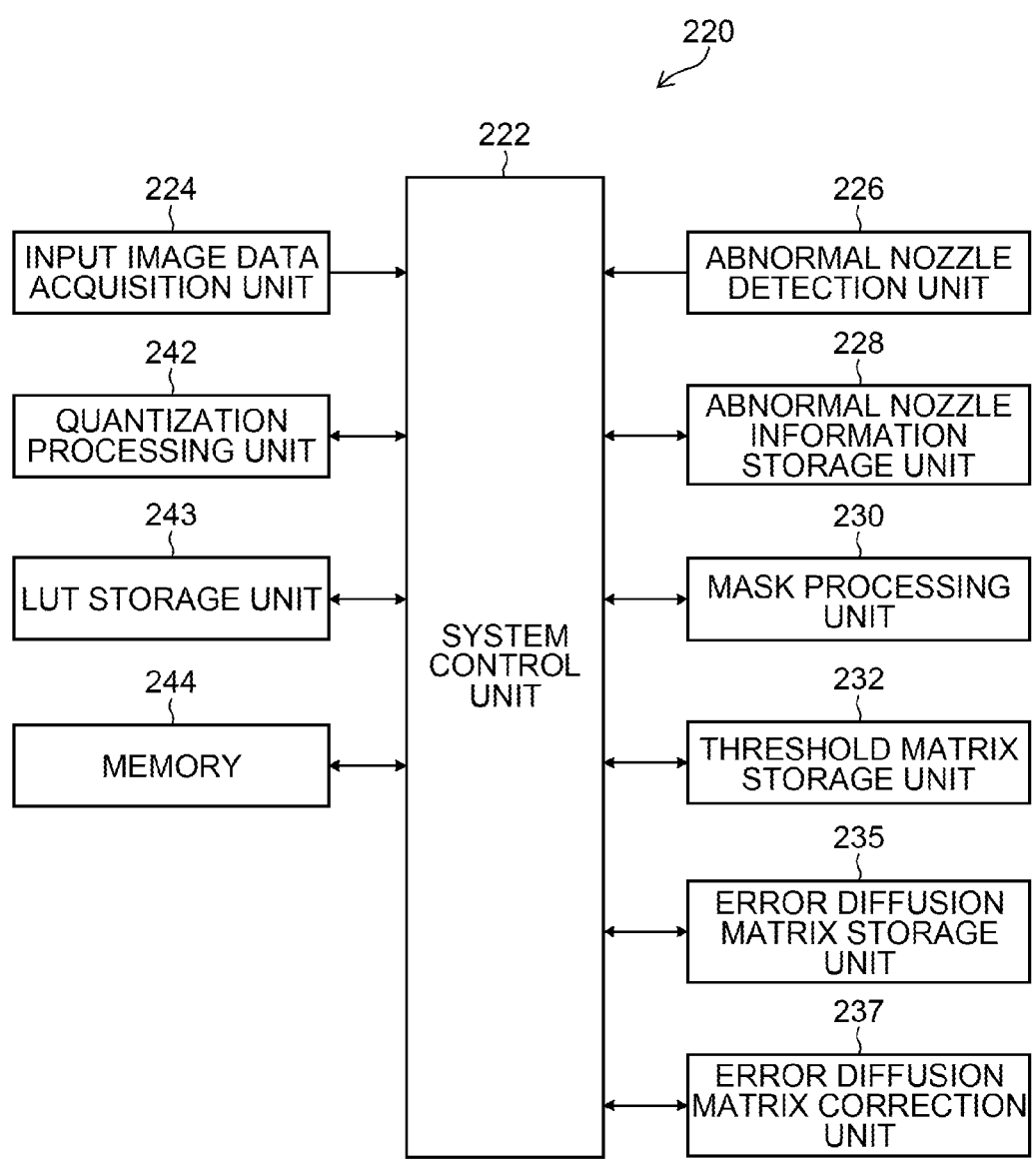
FIG. 13 is an entire configuration diagram of an image processing device according to the second embodiment of the present invention.

FIG. 13 is a block diagram illustrating the whole configuration of a pixel processing device to realize the image processing method according to the second embodiment. An image processing device 220 illustrated in the figure is applicable to an image processing unit that generates a halftone image from input image data in an inkjet recording device.

A system control unit 222, an input image data acquisition unit 224, an abnormal nozzle detection unit 226, an abnormal nozzle information storage unit 228, a mask processing unit 230, a threshold matrix storage unit 232, a quantization processing unit 242 and a memory 244 in the image processing device 220 illustrated in FIG. 13 can adopt the same configurations as the system control unit 102, the input image data acquisition unit 104, the abnormal nozzle detection unit 106, the abnormal nozzle information storage unit 108, the mask processing unit 110, the threshold matrix storage unit 112, the quantization processing unit 122 and the memory 124 illustrated in FIG. 7, and therefore the explanation here is omitted.

An error diffusion matrix storage unit 235 illustrated in FIG. 13 stores an error diffusion matrix (dither[x][y]) used for error diffusion processing.

An error diffusion matrix correction unit 237 corrects the error diffusion matrix so as to exclude a pixel formed by an abnormal nozzle from the target in which a quantization error is diffused. The corrected error diffusion matrix is stored in an error diffusion matrix storage unit 235.

A quantization processing unit 242 reads out the corrected error diffusion matrix from the error diffusion matrix storage unit 235 and applies quantization processing to each pixel of input image data.

A lookup table (LUT) storage unit 243 stores a LUT that stores dot[j][level] illustrated in FIG. 12.

<Effect>

According to the image processing method configured as above, in quantization processing to which the dither error diffusion combination scheme is applied, an error diffusion matrix is configured with respect to a pixel to be formed by an abnormal nozzle based on abnormal nozzle information such that an error caused at the time of quantization processing of peripheral pixels is not diffused. Therefore, the continuity of the flow of an error caused at the time of quantization processing is secured, and the occurrence of an artifact is suppressed.

Moreover, by enlarging the dot size of an adjacent pixel of the pixel to be formed by the abnormal nozzle, the lack of a dot due to the abnormal nozzle is compensated for.

[Explanation of Effect]

Figure 14:
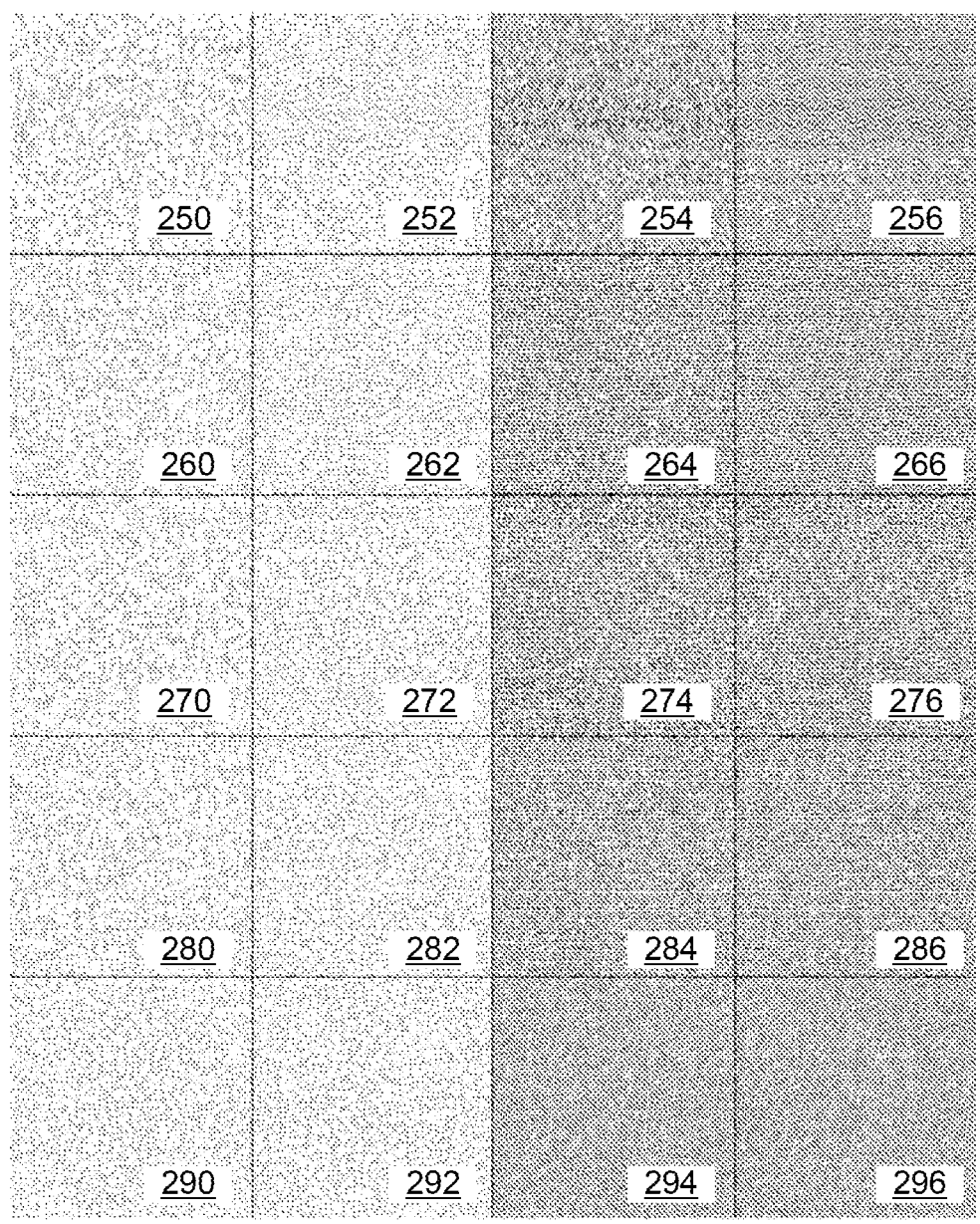
FIG. 14 is an explanatory diagram of effects of the first and second embodiments of the present invention.

FIG. 14 is an explanatory diagram of effects of the image processing method and device according to the first and second embodiments of the present invention. The horizontal sequence in the figure is "solid image (black) in a case where an abnormal nozzle (non-ejection nozzle) occurs in a two-nozzle period" (250 to 256), "solid image (black) in a case where an abnormal nozzle occurs in a three-nozzle period" (260 to 266), "solid image (black) in a case where an abnormal nozzle occurs in a four-nozzle period" (270 to 276), "solid image (black) in a case where an abnormal nozzle occurs at random" (280 to 286), and "solid image (black) in a case where an abnormal nozzle does not occur" (290 to 296) in order from the top.

Moreover, an image in which the last one digit of a reference numeral is "0" or "4" is a solid image in a case where the image processing method shown in this example is not applied, and an image in which the last one digit of the reference numeral is "2" or "6" is a solid image in a case where the image processing method shown in this example is applied.

The difference between the image in which the last one digit of the reference numeral is "0" or "2" and the image in which the last one digit of the reference numeral is "4" or "6" is a density difference, the image in which the last one digit of the reference numeral is "0" or "2" has a density of 90% of the maximum density on 8-bit digital data, and the image in which the last one digit of the reference numeral is "4" or "6" has a density of 70% of the maximum density on the 8-bit digital data.

As illustrated in FIG. 14, in an image to which the image processing shown in this example is applied, even if an abnormal nozzle occurs, an artifact is not visually checked. Moreover, even in a case where the periodicity of the abnormal nozzle changes or the abnormal nozzle irregularly occurs, it is understood that it is possible to acquire the similar effect.

In addition, there is no difference in the effect by the difference in image density, and granular deterioration resulting from the occurrence of the artifact is prevented in various conditions.

[Example of Application to Inkjet Recording Device]

Next, an example of applying the above-mentioned image processing method and device to the inkjet recording device is described.

<Whole Configuration>

Figure 15:
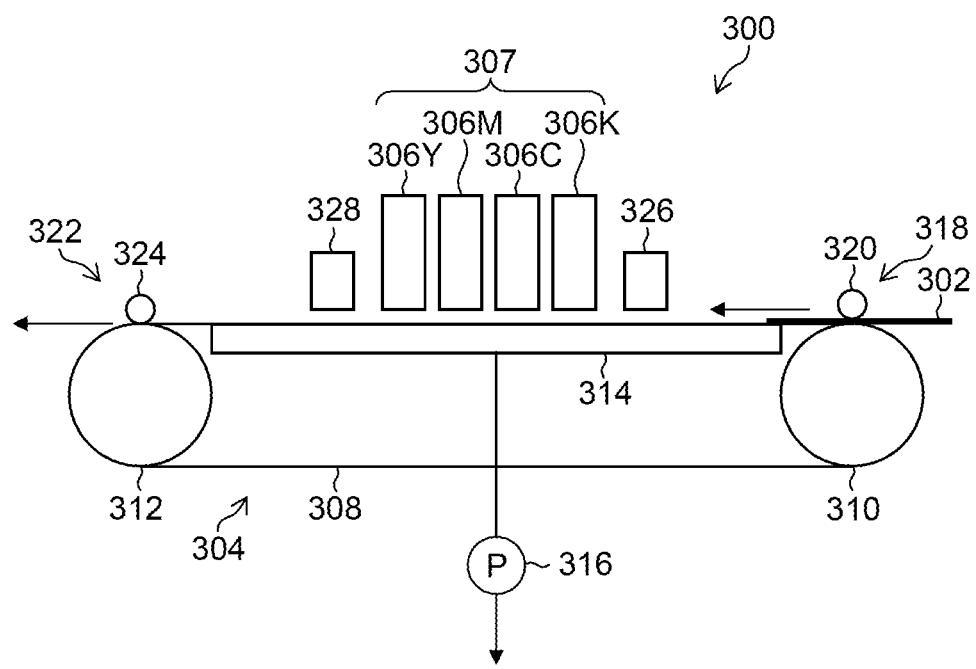
FIG. 15 is an entire configuration diagram of an inkjet recording device to which an image processing method (device) according to the first and second embodiments of the present invention is applied.

FIG. 15 is the whole configuration diagram of an inkjet recording device to which the image processing method according to the above-mentioned first or second embodiment is applied. An inkjet recording device 300 illustrated in the figure is an on-demand-type inkjet recording device. The inkjet recording device 300 includes a recording medium conveyance unit 304 that retains and conveys a recording medium 302, and a printing unit 307 including inkjet heads 306K, 306C, 306M and 306Y that eject color inks corresponding to K (black), C (cyanogen), M (magenta) and Y (yellow) to the recording medium 302 retained by the recording medium conveyance unit 304.

The recording medium conveyance unit 304 includes an endless conveyance belt 308 in which many suction holes (not illustrated) are installed in a recording medium retention region in which the recording medium 302 is retained, conveyance rollers (a drive roller 310 and a driven roller 312) around which the conveyance belt 308 is wound, a chamber 314 that is installed on the rear side of the conveyance belt 308 of the recording medium retention region (surface on the opposite side to the recording medium retention surface in which the recording medium 302 is retained) and communicated with the unillustrated suction holes installed in the recording medium retention region, and a vacuum pump 316 that causes a negative pressure in the chamber 314.

A pressing roller 320 to prevent the recording medium 302 from floating is installed in the carry-in unit 318 in which the recording medium 302 is carried. A pressing roller 324 is installed in an ejection unit 322 from which the recording medium 302 is ejected.

The negative pressure is given from the suction hole installed in the recording medium retention region to the recording medium 302 carried in from the carry-in unit 318, and it is adsorbed and retained to the recording medium retention region of the conveyance belt 308.

On a conveyance path of the recording medium 302, a temperature control unit 326 to adjust the surface temperature of the recording medium 302 within a predetermined range is installed in the front side of the printing unit 307 (upstream side in the recording medium conveyance direction). A readout device 328 (readout sensor) that reads out an image recorded on the recording medium 302 is installed on the rear side of the printing unit 307 (downstream side in the recording medium conveyance direction).

The recording medium 302 carried in from the carry-in unit 318 is adsorbed and retained to the recording medium retention region of the conveyance belt 308, and, after temperature adjustment processing is applied by the temperature control unit 326, image recording is performed in the printing unit 307.

As illustrated in FIG. 15, the inkjet heads 306K, 306C, 306M and 306Y are disposed in this order from the upstream side in the recording medium conveyance direction. When the recording medium 302 passes immediately below the inkjet heads 306K, 306C, 306M and 306Y, the ink of each color of KCMY is deposited to the recording medium 302, and a desired color image is formed.

Here, a printing unit 307 is not limited to the above-mentioned mode. For example, inkjet heads 306LC and 16LM corresponding to LC (light cyanogen) and LM (light magenta) may be included. Moreover, the deposition order of the inkjet heads 306K, 306C, 306M and 306Y can be arbitrarily changed.

After a record image (test pattern) is read out by the readout device 328, the recording medium 302 in which the image is recorded is ejected from the ejection unit 322. The readout result of the readout device 328 is used to determine the ejection abnormality of the inkjet heads 306K, 306C 306M and 306Y.

The inkjet recording device 300 illustrated in FIG. 15 includes an unillustrated ink supply unit. The ink supply unit includes an ink tank that stores ink supplied to the inkjet heads 306K, 306C, 306M and 306Y every color (every head). Each of the ink tanks of the colors and the inkjet heads 306K, 306C 306M and 306Y are communicated with by an unillustrated ink supply path.

<Configuration of Printing Unit>

Figure 16:
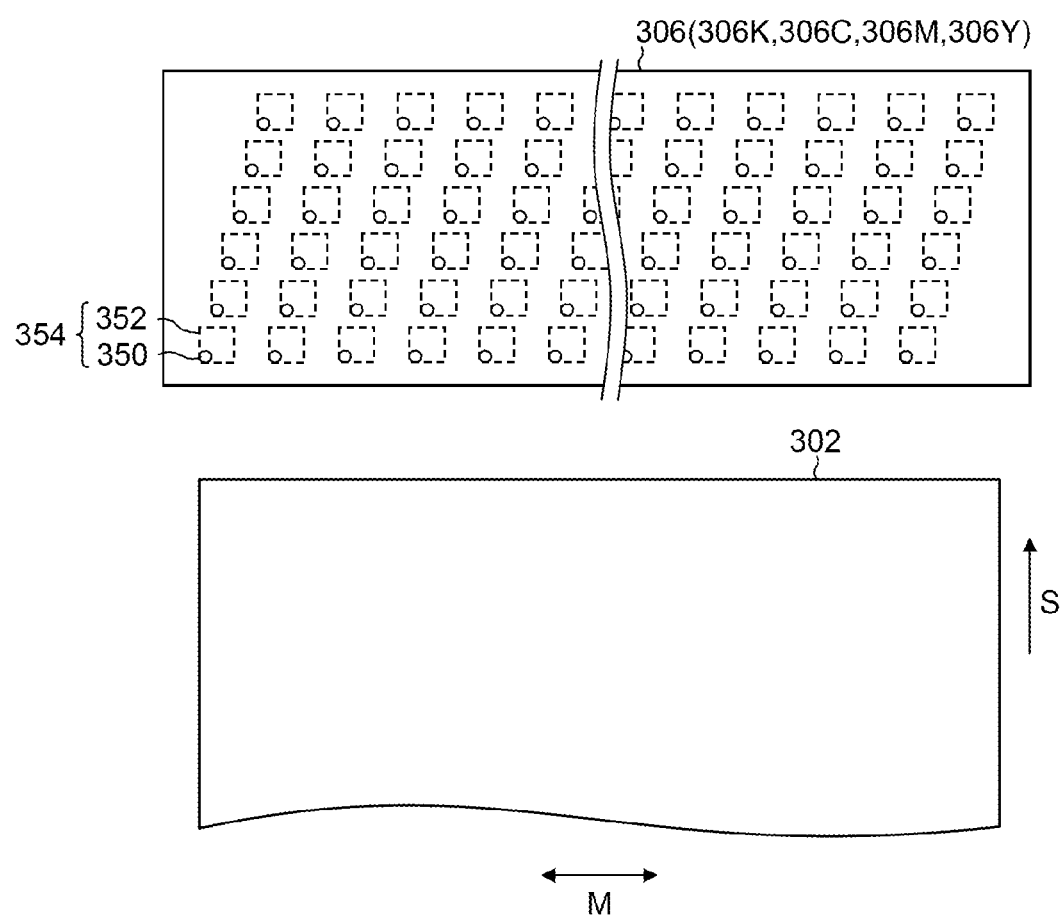
FIG. 16 is a plane perspective view illustrating a configuration example of a printing unit illustrated in FIG. 15.

FIG. 16 is a perspective plane view (view seen from the opposite side surface of an ink ejection surface) illustrating a structure example of the inkjet heads 306K, 306C, 306M and 306Y included in the printing unit 307. Since the inkjet heads 306K, 306C, 306M and 306Y illustrated in FIG. 15 can apply the same structure, it is assumed that common reference numeral 306 is assigned to the inkjet heads 306K, 306C, and 306M and 306Y here and illustrated.

An inkjet head 306 denotes a full-line type inkjet head in which multiple ejection elements 354 including nozzles 350 and pressure chambers 352 are disposed over length that exceeds the total length in main scanning direction M of the recording medium 302.

By the single pass scheme in which the full-line type inkjet head 306 and the recording medium 302 are relatively moved only once, it is possible to record a record image over the whole area of the recording medium 302.

The inkjet head 306 illustrated in FIG. 16 has a structure in which multiple nozzles 350 (ejection elements 354) are disposed in a matrix manner along the row direction along main scanning direction M and a diagonal column direction that is not orthogonal to main scanning direction M and sub-scanning direction S.

As illustrated in FIG. 16, a substantial nozzle disposition density in main scanning direction M is densified by performing matrix disposition of the nozzle 350. Here, nozzle disposition of the inkjet head applicable to the present invention is not limited to the matrix disposition illustrated in FIG. 16.

For example, it is possible to apply a mode where a nozzle column in which the multiple nozzles 350 are disposed along the longitudinal direction of the inkjet head 306 is provided by one column or a mode where the multiple nozzles 350 are disposed in two columns in a staggered manner in the same direction.

As an ejection scheme of the inkjet head 306, it is possible to apply various ejection schemes such as a piezoelectric scheme using the deflection of a piezoelectric element and a thermal scheme using a film boiling phenomenon of ink. The inkjet head 306 to which the piezoelectric scheme is applied includes the nozzle 350 that ejects ink, the pressure chamber 352 that communicates with the nozzle 350 and piezoelectric elements provided on at least one wall surface of the pressure chamber 352.

The piezoelectric element has a structure in which a piezoelectric substance is sandwiched between the upper electrode and the lower electrode, deflection is caused by applying a drive voltage between the upper electrode and the lower electrode, and, by transforming the pressure chamber 352 by the deflection of the piezoelectric element, ink accommodated in the pressure chamber 352 is ejected from the nozzle 350.

Moreover, the inkjet head to which the thermal scheme is applied includes a heater that heats ink accommodated in a pressure chamber (liquid chamber) 352, and generates bubbles by momentarily heating ink in the pressure chamber 352, and ejects the ink from the nozzle 350.

<Explanation of Control System>

Figure 17:
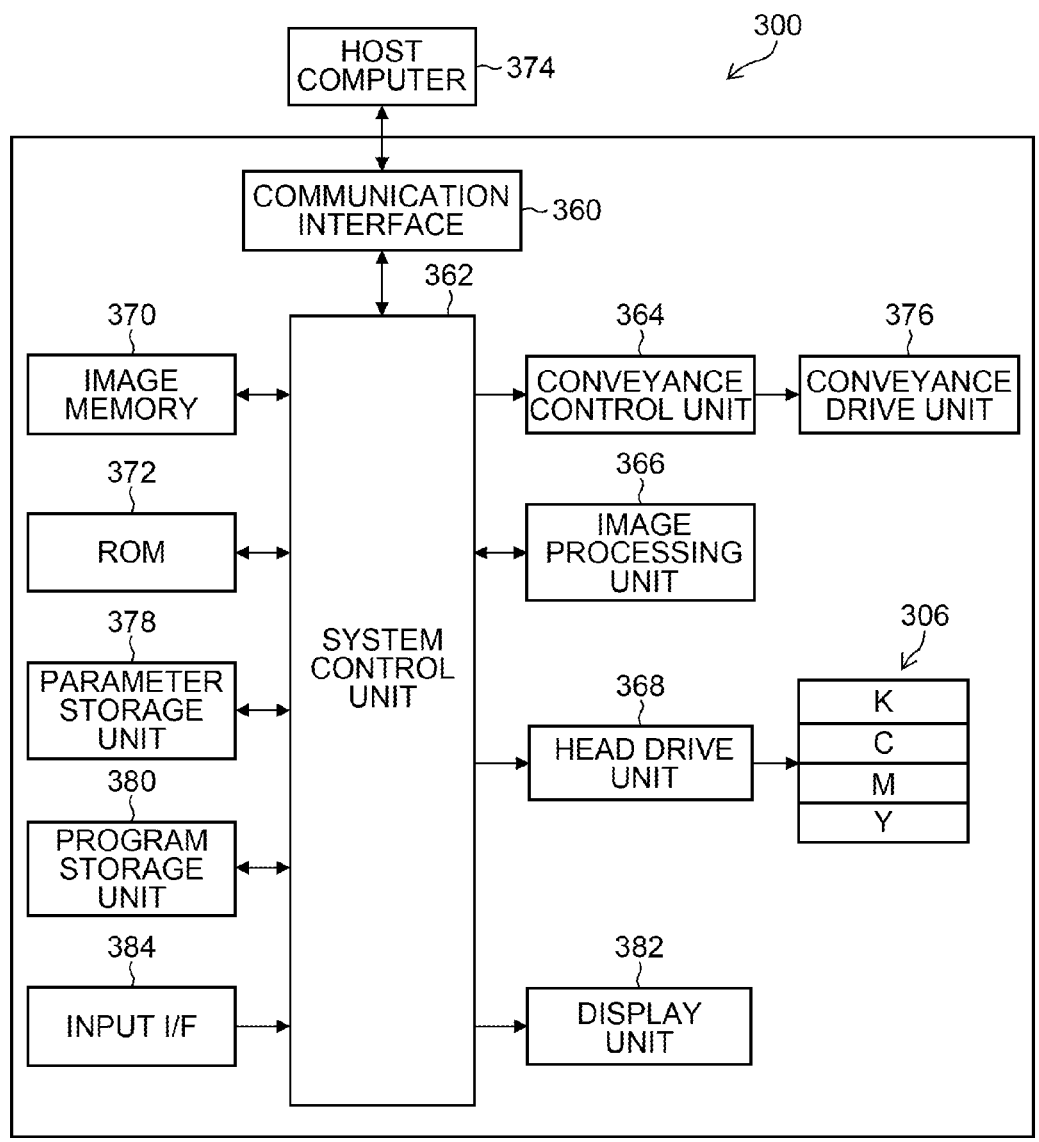
FIG. 17 is a block diagram illustrating a configuration of a control system of an inkjet recording device illustrated in FIG. 1.

FIG. 17 is a block diagram illustrating a schematic configuration of a control system of the inkjet recording device 300. As illustrated in the figure, the inkjet recording device 300 includes a communication interface 360, a system control unit 362, a conveyance control unit 364, an image processing unit 366 and a head drive unit 368, and further includes an image memory 370 and a ROM (Read-Only Memory) 372.

The communication interface 360 denotes an interface unit that receives raster image data sent from a host computer 374. The communication interface 360 may adopt a serial interface such as a USB (Universal Serial Bus) or may adopt a parallel interface such as Centronics. The communication interface 360 may mount a buffer memory (not illustrated) to speed up communication.

The system control unit 362 is configured with a central processing unit (CPU) and a peripheral circuit, and so on, functions as a control device that controls the whole of the inkjet recording device 300 according to a predetermined program and functions as an arithmetic unit that performs various calculations. In addition, the system control unit 362 functions as a memory controller of the image memory 370 and the ROM 372.

That is, the system control unit 362 controls each unit such as the communication interface 360 and the conveyance control unit 364, performs communication control with the host computer 374, performs reading/writing control, and so on, of the image memory 370 and the ROM 372, and generates a control signal that controls each unit described above.

Image data (data of a record image) fed from the host computer 374 is imported in the inkjet recording device 300 through the communication interface 360 and subjected to predetermined image processing by the image processing unit 366.

The image processing unit 366 denotes a control unit which has a signal (image) processing function that performs processing such as various kinds of processing and correction to generate a signal for printing control from image data and which supplies the generated printing data (dot data) to the head drive unit 368.

When required signal processing is performed in the image processing unit 366, the ejection droplet amount (deposition amount) of the inkjet head 306 and the ejection timing are controlled through the head drive unit 368 based on the printing data (halftone image data).

By this means, a desired dot size and dot disposition are realized. Here, the head drive unit 368 illustrated in FIG. 17 may include a feedback control system to keep the driving condition of the inkjet head 306 constant.

The image processing devices 100, 100' and 220 described using FIGS. 1 to 14 are applicable to the image processing unit 366 in FIG. 17.

The conveyance control unit 364 controls the conveyance timing and conveyance speed of a recording medium (see FIG. 1) based on the printing data generated by the image processing unit 366. A conveyance drive unit 376 in FIG. 17 includes a motor that drives the drive roller 310 (312) of the recording medium conveyance unit 304 that conveys the recording medium, and the conveyance control unit 364 functions as a driver of the motor.

The image memory 370 (temporary storage memory) has a function as a temporary storage unit for temporarily storing the image data input through the communication interface 360 once, and a function as a development region of various programs stored in the ROM 372 and an operation working space of the CPU (for example, working space of the image processing unit 366). A volatile memory (RAM: Random Access Memory) that can be sequentially read and written is used for the image memory 370.

The ROM 372 stores a program executed by the CPU of the system control unit 362 and various kinds of data and control parameters required to control each unit of the device, and so on, and data is read and written through the system control unit 362. The ROM 372 is not limited to a memory including semiconductor elements, and a magnetic medium such as a hard disk may be used. Moreover, a detachable storage medium including an external interface may be used.

A parameter storage unit 378 stores various control parameters required for the operation of the inkjet recording device 300. The system control unit 362 arbitrarily reads out a parameter required for control and optionally performs the update (rewriting) of various parameters.

A program storage unit 380 denotes a storage unit for storing a control program to operate the inkjet recording device 300. When the system control unit 362 (or each unit of the device) performs control of each unit of the device, a necessary control program is read out from the program storage unit 380 and the control program is arbitrarily executed.

A display unit 382 denotes a unit for displaying various kinds of information fed from the system control unit 362, and a general-purpose display device such as a LCD (Liquid Crystal Display) monitor is applied. Here, the lighting of a lamp (blink and lights-out) may be applied to the display form of the display unit 382. Moreover, it may include a sound (voice) output unit such as a speaker.

An information input unit such as a keyboard, a mouse and a joy stick is applied to an input interface (I/F) 384. Information input through the input interface 384 is fed to the system control unit 362.

Here, the conveyance of a recording medium is not limited to a belt conveyance scheme, and it is possible to apply other conveyance schemes such as an impression cylinder conveyance scheme and a roller conveyance scheme.

<Other Device Configuration Examples>

Figure 18:
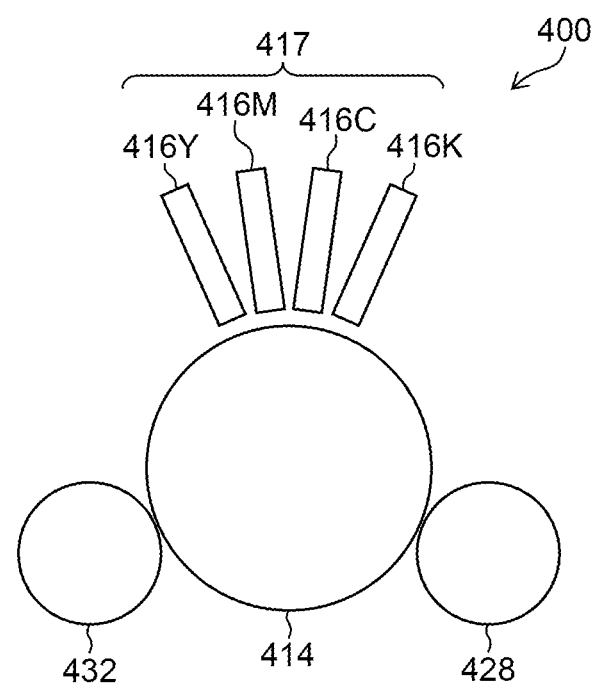
FIG. 18 is an entire configuration diagram of another device configuration.

FIG. 18 is a whole configuration diagram illustrating a schematic configuration of an inkjet recording device 400 in which the impression cylinder conveyance scheme is applied to the conveyance of a recording medium. The inkjet recording device 400 illustrated in the figure adopts the impression cylinder conveyance scheme in which the recording medium is fixed to the outer peripheral surface of an impression cylinder 414 and the recording medium is rotated and conveyed along the outer peripheral surface of the impression cylinder 414 by rotating the impression cylinder 414.

Inkjet heads 416K, 416C, 416M and 416Y are disposed along the outer peripheral surface of the impression cylinder 414 while they are inclined to the horizontal surface. Here, the inkjet heads 416K, 416C, 416M and 416Y can adopt the configurations of the inkjet heads 306K, 306C, 306M and 306Y illustrated in FIG. 15.

A recording medium fed from an unillustrated paper feeding unit is retained to a transfer cylinder 428 and transferred to the impression cylinder 414. The recording medium subjected to image formation is transferred from the impression cylinder 414 to a transfer cylinder 432 on the subsequent side.

Here, in the inkjet recording device 400 illustrated in FIG. 18, a previous process (such as a pre-processing process of the recording medium) and subsequent process (such as a drying process and a fixing process) of image formation may be added. Here, the configuration of the inkjet recording device described using FIGS. 15 to 18 is one example, and the addition, deletion and change of the configuration can be arbitrarily performed.

This example has been described using image processing in image formation of the inkjet scheme as an example, but the image processing method illustrated in this example is also applicable to image formation of others than the inkjet printing scheme such as image formation of the electrophotography scheme.

Moreover, as for the above-mentioned image processing method and device, it is possible to arbitrarily change, add or delete components without departing from the scope of the present invention.

[Invention Disclosed in this Specification]

As understood from the description of the embodiments of the invention described above in detail, this specification contains disclosure of various technical ideas including at least modes described below.

(First mode): An image processing method including: a threshold matrix storage step of storing a threshold matrix used for quantization processing that converts input image data into image data having a gradation number less than a gradation number which the input image data has; an abnormal recording element information acquisition step of acquiring abnormal recording element information; a mask processing step of applying mask processing to an abnormal recording element based on the acquired abnormal recording element information; a threshold matrix correction step of correcting a correspondence relationship between a recording element and a threshold, such that processing of a pixel to be formed by the abnormal recording element subjected to the mask processing is excluded and continuity of a pattern of the threshold matrix is maintained; and a quantization processing step of performing quantization processing using the corrected threshold matrix.

According to the first mode, the abnormal recording element is masked based on the abnormal recording element information, and processing of the pixel to be formed by the abnormal recording element can be excluded. In addition, the correspondence relationship between the recording element and the threshold is corrected such that the continuity of the pattern of the threshold matrix is maintained, quantization processing is performed using the corrected threshold matrix, and therefore the occurrence of discontinuity of the pattern of the threshold matrix due to the mask of the abnormal recording element is suppressed. By this means, the occurrence of an artifact resulting from the lack of a partial threshold of the threshold matrix is suppressed, and graininess of an output image is not deteriorated.

As one example of the recording element, there are a nozzle (ejection element) included in the inkjet head and an LED (Light Emitting Diode) of the electrophotography scheme, and so on.

(Second mode): The image processing method in which, in the threshold matrix correction step, a threshold or pixel value corresponding to the pixel to be formed by the abnormal recording element is changed into a non-recorded threshold or pixel value.

According to such a mode, the pixel formed by the abnormal recording element is excluded from quantization processing using the threshold matrix.

(Third mode): The image processing method in which, in the threshold matrix correction step, a two-dimensionally arranged threshold is shifted along an arrangement direction of the recording element every one threshold group along a direction orthogonal to a recording element arrangement direction.

According to such a mode, after the threshold matrix is corrected, the continuity of the pattern of the threshold in the threshold matrix is maintained.

(Fourth mode): The image processing method in which, in the quantization processing step, quantization processing is performed using error diffusion processing that diffuses an error caused at a time of quantization processing of a processing target pixel to an unprocessed pixel near the processing target pixel, the method including an error diffusion matrix correction step of correcting an error diffusion matrix in which a rule of diffusing the error caused at a time of quantization processing of the processing target pixel to the unprocessed pixel near the processing target pixel is decided, so as to exclude the pixel to be formed by the abnormal recording element from a target to which the error is diffused.

According to such a mode, regarding quantization processing in which the threshold matrix and the error diffusion are used together, the threshold matrix is corrected such that processing of the pixel formed by the abnormal recording element is excluded. Therefore, the occurrence of discontinuity of patterns of the threshold matrix and error diffusion matrix due to the mask of the abnormal recording element is suppressed. In addition, the occurrence of an artifact resulting from the lack of a partial threshold of the threshold matrix and part of the error diffusion matrix is suppressed. Therefore, image graininess is not deteriorated.

(Fifth mode): The image processing method further including a change step of changing a threshold or pixel value of the threshold matrix corresponding to a pixel formed by a normal recording element near the abnormal recording element so as to interpolate a liquid to be ejected by the abnormal recording element.

According to such a mode, the lack of the dot resulting from the occurrence of the abnormal recording element is interpolated by the pixel formed by the recording element near the abnormal recording element.

The recording element near the abnormal recording element includes at least a recording element adjacent to the abnormal recording element.

(Sixth mode): The image processing method in which, in the change step, the threshold or pixel value of the threshold matrix corresponding to the pixel formed by a normal recording element near the abnormal recording element is changed based on a recording characteristic of the normal recording element near the abnormal recording element.

In such a mode, since the recording characteristic of the normal recording element near the abnormal recording element is considered, a lack dot to which the recording characteristic of the normal recording element is reflected is interpolated.

(Seventh mode): The image processing method in which, in the quantization processing step, quantization processing is performed such that a quantization processed image is expressed at multi-gradation by a dot size or dot number with respect to one pixel, and, regarding the pixel formed by the recording element near the abnormal recording element, a dot is selected so as to exceed a size or dot number to be originally formed.

For example, in a case where four gradations are expressed using three kinds of dot sizes of larger, medium and smaller, a mode is possible in which the occurrence probability of a dot of the large size rises in the pixel formed by the recording element near the abnormal recording element as compared with a pixel formed by a usual (normal) recording element.

(Eighth mode): The image processing method in which, in the quantization processing step, when the dot size of the pixel formed by the recording element near the abnormal recording element is changed, a dot size is selected according to a pixel value of the pixel.

In such a mode, a mode is preferable in which a lookup table that stores the dot size or dot number of each gradation is switched.

(Ninth mode): The image processing method in which, in the quantization processing step, quantization processing is performed along a direction orthogonal to an arrangement direction of a recording element.

According to such a mode, it is possible to start quantization processing from a part in which the threshold matrix is corrected, and it is possible to perform correction of the threshold matrix and quantization processing in parallel.

(Tenth mode): An image processing device including: a threshold matrix storage unit configured to store a threshold matrix used for quantization processing that converts input image data into image data having a gradation number less than a gradation number which the input image data has; an abnormal recording element information acquisition unit configured to acquire abnormal recording element information; a mask processing unit configured to apply mask processing to an abnormal recording element based on the acquired abnormal recording element information; a threshold matrix correction unit configured to correct a correspondence relationship between a recording element and a threshold, such that processing of a pixel to be formed by the recording element subjected to the mask processing is excluded and continuity of a pattern of the threshold matrix is maintained; and a quantization processing unit configured to perform quantization processing using the corrected threshold matrix.

(Eleventh mode): The image processing device that executes an image processing method according to any one of the second to ninth modes.

(Twelfth mode): An image forming device including an image processing unit including: a threshold matrix storage unit configured to store a threshold matrix used for quantization processing that converts input image data into image data having a gradation number less than a gradation number which the input image data has; an abnormal recording element information acquisition unit configured to acquire abnormal recording element information; a mask processing unit configured to apply mask processing to an abnormal recording element based on the acquired abnormal recording element information; a threshold matrix correction unit configured to correct a correspondence relationship between a recording element and a threshold, such that processing of a pixel to be formed by the recording element subjected to the mask processing is excluded and continuity of a pattern of the threshold matrix is maintained; and a quantization processing unit configured to perform quantization processing using the corrected threshold matrix, the device including an image forming unit configured to form an image on a medium based on the input image data subjected to the quantization processing.

(Thirteenth mode): The image forming device in which the image processing unit executes an image processing method according to any one of the second to ninth modes.

(Fourteenth mode): An inkjet recording device including an image forming device according to the twelfth or thirteenth mode, in which the image forming unit includes an inkjet head that ejects ink from a nozzle.

What is claimed is:

1. An image processing method comprising:
   a threshold matrix storage step of storing a threshold matrix used for quantization processing that converts input image data into image data having a gradation number less than a gradation number which the input image data has;
   an abnormal recording element information acquisition step of acquiring abnormal recording element information;
   a mask processing step of applying mask processing to an abnormal recording element based on the acquired abnormal recording element information;
   a threshold matrix correction step of correcting a correspondence relationship between a recording element and a threshold, such that processing of a pixel to be formed by the abnormal recording element subjected to the mask processing is excluded and continuity of a pattern of the threshold matrix is maintained; and
   a quantization processing step of performing quantization processing using the corrected threshold matrix.

2. The image processing method according to claim 1, wherein in the threshold matrix correction step, a threshold or pixel value corresponding to the pixel to be formed by the abnormal recording element is changed into a non-recorded threshold or pixel value.

3. The image processing method according to claim 1,
wherein in the threshold matrix correction step, a two-dimensionally arranged threshold is shifted along an arrangement direction of the recording element every one threshold group along a direction orthogonal to a recording element arrangement direction.

4. The image processing method according to claim 1,
wherein in the quantization processing step, quantization processing is performed using error diffusion processing that diffuses an error caused at a time of quantization processing of a processing target pixel to an unprocessed pixel near the processing target pixel,
the method comprising an error diffusion matrix correction step of correcting an error diffusion matrix in which a rule of diffusing the error caused at a time of quantization processing of the processing target pixel to the unprocessed pixel near the processing target pixel is decided, so as to exclude the pixel to be formed by the abnormal recording element from a target to which the error is diffused.

5. The image processing method according to claim 1, further comprising
a change step of changing a threshold or pixel value of the threshold matrix corresponding to a pixel formed by a normal recording element near the abnormal recording element so as to interpolate a liquid to be ejected by the abnormal recording element.

6. The image processing method according to claim 5,
wherein in the change step, the threshold or pixel value of the threshold matrix corresponding to the pixel formed by a normal recording element near the abnormal recording element is changed based on a recording characteristic of the normal recording element near the abnormal recording element.

7. The image processing method according to claim 5,
wherein in the quantization processing step, quantization processing is performed such that a quantization processed image is expressed at multi-gradation by a dot size or dot number with respect to one pixel, and, regarding the pixel formed by the recording element near the abnormal recording element, a dot is selected so as to exceed a size or dot number to be originally formed.

8. The image processing method according to claim 7,
wherein, in the quantization processing step, when the dot size of the pixel formed by the recording element near the abnormal recording element is changed, a dot size is selected according to a pixel value of the pixel.

9. The image processing method according to claim 1,
wherein in the quantization processing step, quantization processing is performed along a direction orthogonal to an arrangement direction of a recording element.

10. An image processing device comprising:
a threshold matrix storage unit configured to store a threshold matrix used for quantization processing that converts input image data into image data having a gradation number less than a gradation number which the input image data has;
an abnormal recording element information acquisition unit configured to acquire abnormal recording element information;
a mask processing unit configured to apply mask processing to an abnormal recording element based on the acquired abnormal recording element information;
a threshold matrix correction unit configured to correct a correspondence relationship between a recording element and a threshold, such that processing of a pixel to be formed by the recording element subjected to the mask processing is excluded and continuity of a pattern of the threshold matrix is maintained; and
a quantization processing unit configured to perform quantization processing using the corrected threshold matrix.

11. An image forming device comprising:
an image processing unit including:
a threshold matrix storage unit configured to store a threshold matrix used for quantization processing that converts input image data into image data having a gradation number less than a gradation number which the input image data has;
an abnormal recording element information acquisition unit configured to acquire abnormal recording element information;
a mask processing unit configured to apply mask processing to an abnormal recording element based on the acquired abnormal recording element information;
a threshold matrix correction unit configured to correct a correspondence relationship between a recording element and a threshold, such that processing of a pixel to be formed by the recording element subjected to the mask processing is excluded and continuity of a pattern of the threshold matrix is maintained; and
a quantization processing unit configured to perform quantization processing using the corrected threshold matrix; and
an image forming unit configured to form an image on a medium based on the input image data subjected to the quantization processing.

12. An inkjet recording device comprising an image forming device according to claim 11,
wherein the image forming unit includes an inkjet head that ejects ink from a nozzle.

\* \* \* \* \*